(12) United States Patent
Yamaguchi et al.

(10) Patent No.: US 11,993,090 B2
(45) Date of Patent: *May 28, 2024

(54) PRINTING DEVICE

(71) Applicant: SEIKO EPSON CORPORATION, Tokyo (JP)

(72) Inventors: Yoshiyuki Yamaguchi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 17/649,076

(22) Filed: Jan. 27, 2022

(65) Prior Publication Data

US 2022/0242140 A1 Aug. 4, 2022

(30) Foreign Application Priority Data

Jan. 29, 2021 (JP) ................. 2021-013287

(51) Int. Cl.
*B41J 3/46* (2006.01)
*B41J 29/13* (2006.01)
*G06F 3/041* (2006.01)

(52) U.S. Cl.
CPC ............... *B41J 3/46* (2013.01); *B41J 29/13* (2013.01); *G06F 3/0416* (2013.01)

(58) Field of Classification Search
CPC ......... B41J 2/07; B41J 2/11; B41J 3/46; B41J 29/13; G06F 3/044; G06F 3/0416; G06F 3/167

See application file for complete search history.

(56) References Cited

U.S. PATENT DOCUMENTS

| 8,379,231 | B2 | 2/2013 | Nakai et al. |
| 9,793,958 | B2 * | 10/2017 | Funakawa ............ H04B 5/0093 |
| 11,467,689 | B2 | 10/2022 | Yamaguchi et al. |
| 11,531,368 | B2 * | 12/2022 | Fukumoto ................ B41J 29/13 |
| 11,652,934 | B2 | 5/2023 | Hori |
| 11,689,673 | B2 | 6/2023 | Kobayashi et al. |
| 2006/0171734 | A1 | 8/2006 | Maeda |
| 2009/0316201 | A1 | 12/2009 | Nakai et al. |

(Continued)

FOREIGN PATENT DOCUMENTS

| JP | H06-199010 A | 7/1994 |
| JP | 2006-251168 A | 9/2006 |

(Continued)

*Primary Examiner* — Christopher E Mahoney
*Assistant Examiner* — Marissa Ferguson-Samreth
(74) *Attorney, Agent, or Firm* — Global IP Counselors, LLP

(57) ABSTRACT

A printing device includes a panel unit including: a display panel; a capacitive touch sensor in which a position detection sensor and a cover glass are laminated and which includes a first side and a second side located facing each other; and a panel circuit board, the capacitive touch sensor in the second attachment state is disposed so that the first side is lower than the second side, and a size of a first frame area located along the first side in a frame area that does not receive an input of operation information of the capacitive touch sensor in a direction from the first side to the second side is larger than a size of a second frame area located along the second side in the frame area in the direction from the first side to the second side.

5 Claims, 10 Drawing Sheets

(56) References Cited

U.S. PATENT DOCUMENTS

| | | |
|---|---|---|
| 2015/0054865 A1 | 2/2015 | Landa et al. |
| 2015/0242026 A1 | 8/2015 | Nakamura et al. |
| 2016/0075130 A1 | 3/2016 | Landa et al. |
| 2016/0224289 A1* | 8/2016 | Yamanaka ......... H04N 1/00408 |
| 2017/0054866 A1 | 2/2017 | Cho |
| 2017/0064106 A1* | 3/2017 | Murakami ......... H04N 1/00496 |
| 2022/0242140 A1 | 8/2022 | Yamaguchi et al. |
| 2022/0244799 A1 | 8/2022 | Yamaguchi et al. |
| 2022/0244807 A1 | 8/2022 | Yamaguchi et al. |
| 2022/0279081 A1* | 9/2022 | Kobayashi .......... G06F 3/04164 |
| 2022/0279082 A1 | 9/2022 | Hori |

FOREIGN PATENT DOCUMENTS

| | | |
|---|---|---|
| JP | 2007-310050 A | 11/2007 |
| JP | 2010-004134 A | 1/2010 |
| JP | 2016-167819 A | 9/2016 |

* cited by examiner

PRINTING DEVICE

The present application is based on, and claims priority from JP Application Serial Number 2021-013287, filed Jan. 29, 2021, the disclosure of which is hereby incorporated by reference herein in its entirety.

BACKGROUND

1. Technical Field

The present disclosure relates to a printing device.

2. Related Art

In recent years, printing devices have been used in a wide variety of environments such as homes and offices. Therefore, when manufacturing a printing device, there is a need to develop a printing device with excellent usability that anyone can use in the same way regardless of the height and gender of a user who uses the printing device and whether or not there is a disability.

As a technique focusing on the viewpoint of providing such a printing device with excellent usability, for example, printing devices as described in JP-A-2007-310050 and JP-A-2006-251168, which are provided with a mechanism for rotating an operation portion in consideration of the height of a user and the like, a printing device provided with a large display as described in JP-A-2010-004134, and a printing device provided with a capacitive touch panel as described in JP-A-2016-167819, and the like are known.

However, from the viewpoint of providing a printing device with excellent operability, when the techniques described in JP-A-2007-310050, JP-A-2006-251168, JP-A-2010-004134, and JP-A-2016-167819 are combined, a new problem arises due to the combination.

When a touch panel of 8 inches or more, which has been recognized as a large screen in electronic devices such as smartphones in recent years, is rotatably incorporated into the printing device as a user interface in the printing device, the screen size of the touch panel becomes large, so that the weight also increases, and it becomes necessary to have a strong configuration as a support portion that supports the rotation of the touch panel. Therefore, the structure of the support portion that supports the rotation of the touch panel becomes large, and the printing device itself becomes large. Then, as the printing device becomes large, the space for installing the printing device is limited. That is, when a touch panel of 8 inches or more is rotatably incorporated into a printing device, there is a possibility of impairing usability from the viewpoint that a large space for installing the printing device is required.

Further, as described in JP-A-6-199010, in a printing device, a large amount of static electricity is generated due to the transport of a medium and is discharged via a housing of the printing device. That is, a large amount of static electricity may be generated in the printing device, and a large amount of electric charge due to the static electricity may be stored in the printing device. When a capacitive touch panel is used as a user interface for such a printing device that easily generates static electricity, the capacitive touch panel operates based on the change of the electric field on the panel surface, so that there is a possibility that the capacitive touch panel may malfunction due to the static electricity generated in the printing device.

Further, from the viewpoint of providing a printing device with excellent usability, when a large-screen and rotatable capacitive touch panel is applied to the printing device, the static electricity generated in the printing device enters the inside of the capacitive touch panel via an operator who operates the capacitive touch panel, and as a result, there is a possibility that the capacitive touch panel may malfunction.

That is, from the viewpoint of providing a printing device with excellent operability by combining the techniques described in JP-A-2007-310050, JP-A-2006-251168, JP-A-2010-004134, and JP-A-2016-167819, simply combining existing techniques is not enough, and there is room for further improvement.

SUMMARY

According to an aspect of the present disclosure, there is provided a printing device including a printing unit that performs printing on a medium, and a panel unit to which operation information for operating the printing unit is input, in which the printing unit includes a printing mechanism that executes a printing operation according to the operation information, and a main circuit board including a processor that controls an operation of the panel unit and controls an operation of the printing mechanism based on the operation information, the panel unit includes a display panel, a capacitive touch sensor in which a position detection sensor and a cover glass are laminated, a panel circuit board electrically coupled to the capacitive touch sensor, and a panel housing that stores the display panel, the capacitive touch sensor, and the panel circuit board, the capacitive touch sensor includes a first side, a second side located facing the first side, a third side intersecting both the first side and the second side, and a fourth side located facing the third side, the panel unit is rotatably attached to the printing unit so as to take a first attachment state and a second attachment state, in the first attachment state, an angle formed by a horizontal direction and a normal direction of the capacitive touch sensor is larger than an angle formed by a vertical direction and the normal direction of the capacitive touch sensor, in the second attachment state, the angle formed by the horizontal direction and the normal direction of the capacitive touch sensor is smaller than the angle formed by the vertical direction and the normal direction of the capacitive touch sensor, when the panel unit is in the second attachment state, the capacitive touch sensor is disposed so that the first side is lower than the second side in a direction along the vertical direction, the capacitive touch sensor includes an operation area that receives an input of the operation information and a frame area that is provided around the operation area and does not receive the input of the operation information, and a size of a first frame area located along the first side in the frame area in a direction from the first side to the second side is larger than a size of a second frame area located along the second side in the frame area in the direction from the first side to the second side.

DESCRIPTION OF EXEMPLARY EMBODIMENTS

Hereinafter, preferred embodiments of the present disclosure will be described with reference to the drawings. The drawings used are for convenience of description. The embodiments to be described below do not unduly limit the contents of the present disclosure described in the scope of claims. In addition, all of the configurations to be described below are not necessarily essential configuration requirements of the present disclosure.

Hereinafter, as the printing device according to the present disclosure, an ink jet printer that prints an image by ejecting a liquid onto a medium will be described as an example, but the printing device is not limited to the ink jet printer, and may be a dot impact printer, a thermal transfer printer, a laser printer, or the like.

1. Functional Configuration of Printing Device

Figure 1:
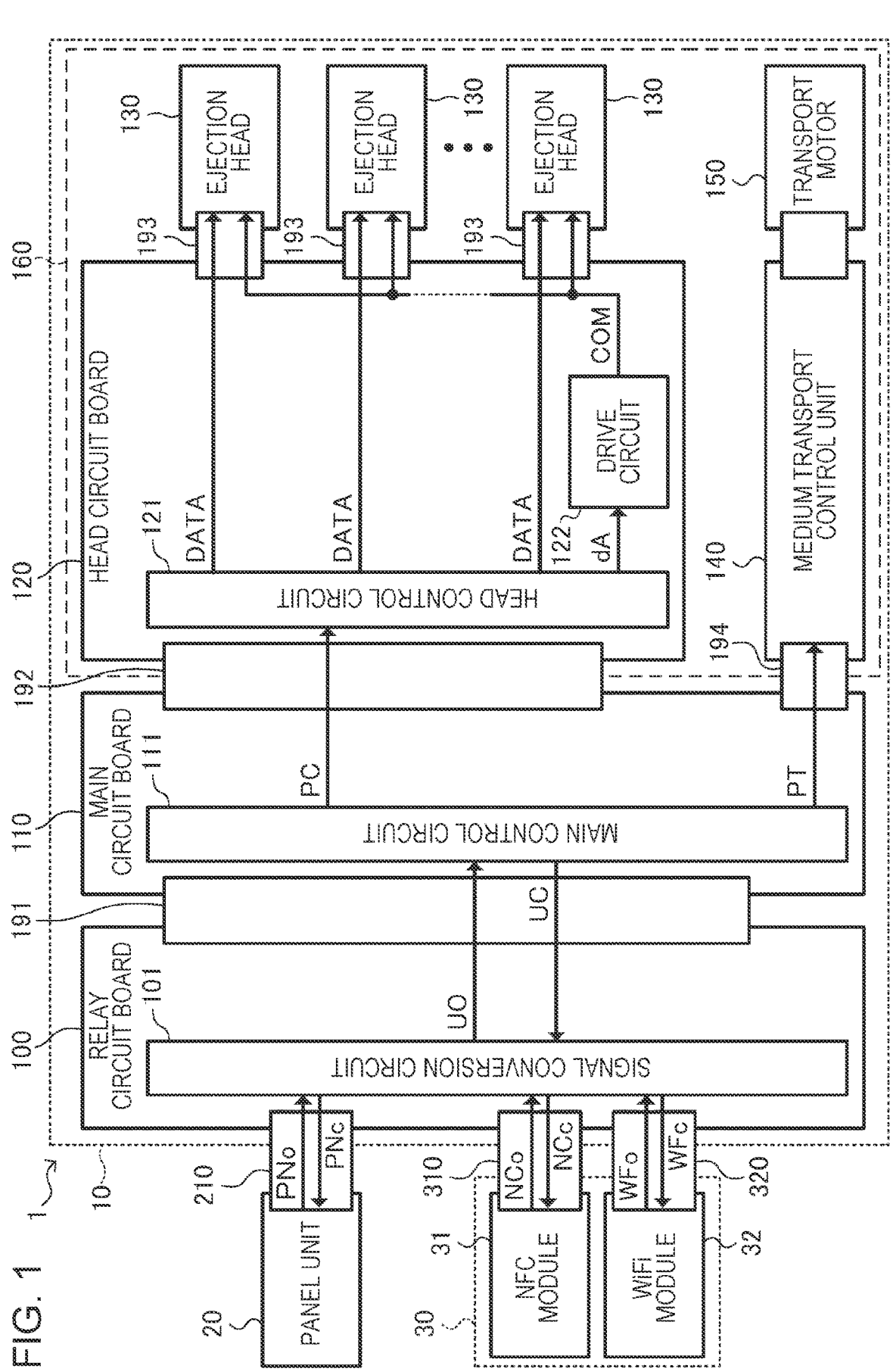
FIG. 1 is a diagram for describing a functional configuration of a printing device.

FIG. 1 is a diagram for describing a functional configuration of a printing device 1. As shown in FIG. 1, the printing device 1 includes a printing unit 10, a panel unit 20, and a wireless communication unit 30. Then, the printing device 1 prints a desired image on a medium by causing the printing unit 10 to land ink at a predetermined position on the medium based on information input from the panel unit 20 and the wireless communication unit 30. That is, the printing device 1 includes a printing unit 10 that performs printing on a medium, and a panel unit 20 and a wireless communication unit 30 to which operation information for operating the printing unit 10 is input.

Here, although the medium to be printed by the printing device 1 in the present embodiment will be described as sheet-fed paper, the medium used in the printing device 1 is not limited to sheet-fed paper, and may be roll paper. Further, the medium is not limited to paper, and may be a fiber material such as a cloth or a resin such as plastic.

Operation information for operating the printing device 1 is input to the panel unit 20 by an operation of a user, and an operating state of the printing device 1 is displayed thereon. Specifically, the operation of the panel unit 20 is controlled by a panel control signal PNc input from the printing unit 10 via a cable 210, and the operating state of the printing device 1 propagated based on the panel control signal PNc is displayed thereon. Further, the panel unit 20 outputs the operation information input by the user as a panel operation signal PNo to the printing unit 10 via the cable 210. Here, the panel control signal PNc input to the panel unit 20 and the panel operation signal PNo output by the panel unit 20 may be, for example, a signal conforming to I squared C (I2C) communication propagated by serial data and a serial clock, or a differential signal such as low voltage differential signaling (LVDS) communication. The details of the functional configuration of the panel unit 20 and the details of the structure will be described later.

The wireless communication unit 30 includes a near field communication (NFC) module 31 that performs wireless communication at a short distance of several cm to several tens of cm, and a WiFi module 32 capable of long-distance and high-speed wireless communication as compared with the NFC module 31.

The operation of the NFC module 31 is controlled based on an NFC control signal NCc input from the printing unit 10 via the cable 310, and information input to the NFC module 31 as a wireless signal is output to the printing unit 10 via the cable 310 as an NFC reception signal NCo. Such an NFC module 31 that performs wireless communication at a short distance of several cm to several tens of cm is used, for example, for an authentication function for correlating a user who executed the printing operation with the medium on which the printing operation is executed when the printing device 1 is shared by a plurality of users.

The operation of the WiFi module 32 capable of long-distance and high-speed wireless communication is controlled based on a WiFi control signal WFc input from the printing unit 10 via a cable 320, and information input to the WiFi module 32 as a wireless signal is output to the printing unit 10 via the cable 320 as a WiFi reception signal WFo. Such a WiFi module 32 capable of long-distance and high-speed wireless communication also functions as an interface circuit that connects the printing device 1 with an external device such as a personal computer that outputs image information to be printed on the medium by the printing device 1 by a wireless signal.

Here, the NFC module 31 and the WiFi module 32 may be detachable from the printing device 1 by being communicably connected by, for example, universal serial bus (USB) communication. That is, the printing device 1 includes a connection terminal to which at least one of the NFC module 31 and the WiFi module 32 can be attached.

The printing unit 10 includes a relay circuit board 100, a main circuit board 110, a head circuit board 120, a plurality of ejection heads 130, a medium transport control unit 140, and a transport motor 150.

The main circuit board 110 includes a main control circuit 111 that outputs a control signal for controlling each portion of the printing device 1. The main control circuit 111 includes a system on a chip (SoC) including a central processing unit (CPU).

The main control circuit 111 outputs a unit control signal UC for controlling the operation of the panel unit 20 and the wireless communication unit 30. The unit control signal UC is input to a signal conversion circuit 101 in the relay circuit board 100 via a cable 191. The signal conversion circuit 101 generates the panel control signal PNc for controlling the panel unit 20, the NFC control signal NCc for controlling the NFC module 31, and the WiFi control signal WFc for controlling the WiFi module 32 based on the unit control signal UC input from the main control circuit 111, and outputs the panel control signal PNc, the NFC control signal NCc, and the WiFi control signal WFc to the panel unit 20, the NFC module 31, and the WiFi module 32, respectively.

Further, the panel operation signal PNo output by the panel unit 20, the NFC reception signal NCo output by the NFC module 31, and the WiFi reception signal WFo output by the WiFi module 32 are input to the signal conversion circuit 101. Then, the signal conversion circuit 101 generates a unit output signal UO based on the input panel operation signal PNo, NFC reception signal NCo, and WiFi reception signal WFo, and outputs the unit output signal UO to the main control circuit 111.

Here, the signal conversion circuit 101 may be configured as one integrated circuit device, or may be configured as a plurality of integrated circuit devices corresponding to each of the panel unit 20, the NFC module 31, and the WiFi module 32. Further, the unit control signal UC and the unit output signal UO propagating between the signal conversion circuit 101 and the main control circuit 111 may be a plurality of signals corresponding to each of the panel unit 20, the NFC module 31, and the WiFi module 32. That is, the main control circuit 111 may output a plurality of signals corresponding to each of the panel control signal PNc, the NFC control signal NCc, and the WiFi control signal WFc as the unit control signal UC to the signal conversion circuit 101, and the signal conversion circuit 101 may output a plurality of signals corresponding to each of the panel operation signal PNo, the NFC reception signal NCo, and the WiFi reception signal WFo as the unit output signal UO to the main control circuit 111.

Further, the main control circuit 111 transports the medium on which the printing operation is executed based on the unit output signal UO input from the signal conversion circuit 101. Specifically, the main control circuit 111 generates a transport control signal PT for transporting the medium on which the printing operation is executed, and outputs the transport control signal PT to the medium transport control unit 140 via a cable 194. The medium transport control unit 140 generates a drive control signal for controlling the drive of the transport motor 150 based on the input transport control signal PT, and outputs the drive control signal to the transport motor 150. Thereby, the transport motor 150 is driven, and the medium is transported along a predetermined transport direction as the transport motor 150 is driven.

Further, the main control circuit 111 generates a print control signal PC for performing printing on the medium based on the unit output signal UO input from the signal conversion circuit 101, and outputs the print control signal PC to the head circuit board 120 via the cable 192.

The print control signal PC is input to a head control circuit 121 in the head circuit board 120. The head control circuit 121 generates a print data signal DATA corresponding to each of the plurality of ejection heads 130 having a plurality of nozzles for ejecting ink to the medium based on the input print control signal PC, and supplies the print data signal DATA to the corresponding ejection head 130. Further, the head control circuit 121 generates a basic drive signal dA which is a basis of a drive signal COM based on the print control signal PC input from the signal conversion circuit 101, and outputs the basic drive signal dA to the drive circuit 122. Then, the drive circuit 122 generates a drive signal COM having a waveform defined by the basic drive signal dA supplied from the head control circuit 121, and outputs the drive signal COM to the plurality of ejection heads 130.

Each of the plurality of ejection heads 130 includes a plurality of nozzles for ejecting ink to the medium, and a plurality of drive elements that correspond to each of the plurality of nozzles and drive the ink to be ejected from the corresponding nozzles by being supplied with the drive signal COM. Each of the plurality of ejection heads 130 is electrically coupled to the head circuit board 120 via a cable 193. Each of the ejection heads 130 supplies the drive signal COM to the drive element corresponding to the nozzle that ejects ink to the medium among the plurality of nozzles and does not supply the drive signal COM to the drive element corresponding to the nozzle that does not eject ink to the medium among the plurality of nozzles by switching whether or not to supply the drive signal COM supplied from the drive circuit 122 to each of the plurality of drive elements based on the print data signal DATA supplied from the head control circuit 121. Thereby, ink is ejected only from the nozzle corresponding to the drive element to which the drive signal COM is supplied, and ink is not ejected from the nozzle corresponding to the drive element to which the drive signal COM is not supplied. That is, the plurality of ejection heads 130 eject ink at timings defined by the print data signal DATA and from the nozzles designated by the print data signal DATA by switching whether or not to supply the drive signal COM to each of the plurality of drive elements based on the print data signal DATA output by the head control circuit 121.

As described above, in the printing device 1 according to the present embodiment, the main control circuit 111 controls the transport of the medium via the medium transport control unit 140, and also controls the operation of the head control circuit 121 in the head circuit board 120 based on the operation information input from the panel unit 20 and the wireless communication unit 30. Thereby, a nozzle that ejects ink to the medium and a nozzle that does not eject ink are selected. That is, the main control circuit 111 controls both the transport of the medium and the ejection timing of the ink. Thereby, the ejection head 130 can land the ink at a desired position on the medium. That is, dots are formed at a desired position on the medium. Thereby, the printing device 1 prints a desired image on the medium.

Here, in the following description, a configuration including the head circuit board 120, the plurality of ejection heads 130, the medium transport control unit 140, and the transport motor 150, which execute printing operations on the medium under the control of the main circuit board 110, may be collectively referred to as a printing mechanism 160. That is, the printing unit 10 includes the printing mechanism 160 that executes a printing operation of printing an image on a medium according to the operation information input by a user operating the panel unit 20 or the wireless communication unit 30, and the main circuit board 110 including the main control circuit 111 that outputs the unit control signal UC for controlling the operation of the panel unit 20 and the wireless communication unit 30 and that controls the operation of the printing mechanism 160 according to the unit output signal UO based on the panel operation signal PNo, the NFC reception signal NCo, and the WiFi reception signal WFo output by the panel unit 20 and the wireless communication unit 30.

The printing device 1 may have a USB port, a local area network (LAN) port, or the like for connecting the printing device 1 and an external device by a LAN cable or a USB cable, and further, the printing device 1 may be able to read image information stored in a storage medium such as a hard disk or a flash memory connected to the USB port, the LAN port, or the like by the operation of the panel unit 20 by the user, and to execute a printing operation based on the read information. Further, the printing device 1 may include a scanner unit that acquires image information formed on the medium. That is, the printing device 1 may be a so-called multifunction device capable of forming an image on a medium and acquiring the image formed on the medium.

Here, the main control circuit 111 in the main circuit board 110 is an example of a processor.

2. Functional Configuration of Panel Unit

Figure 2:
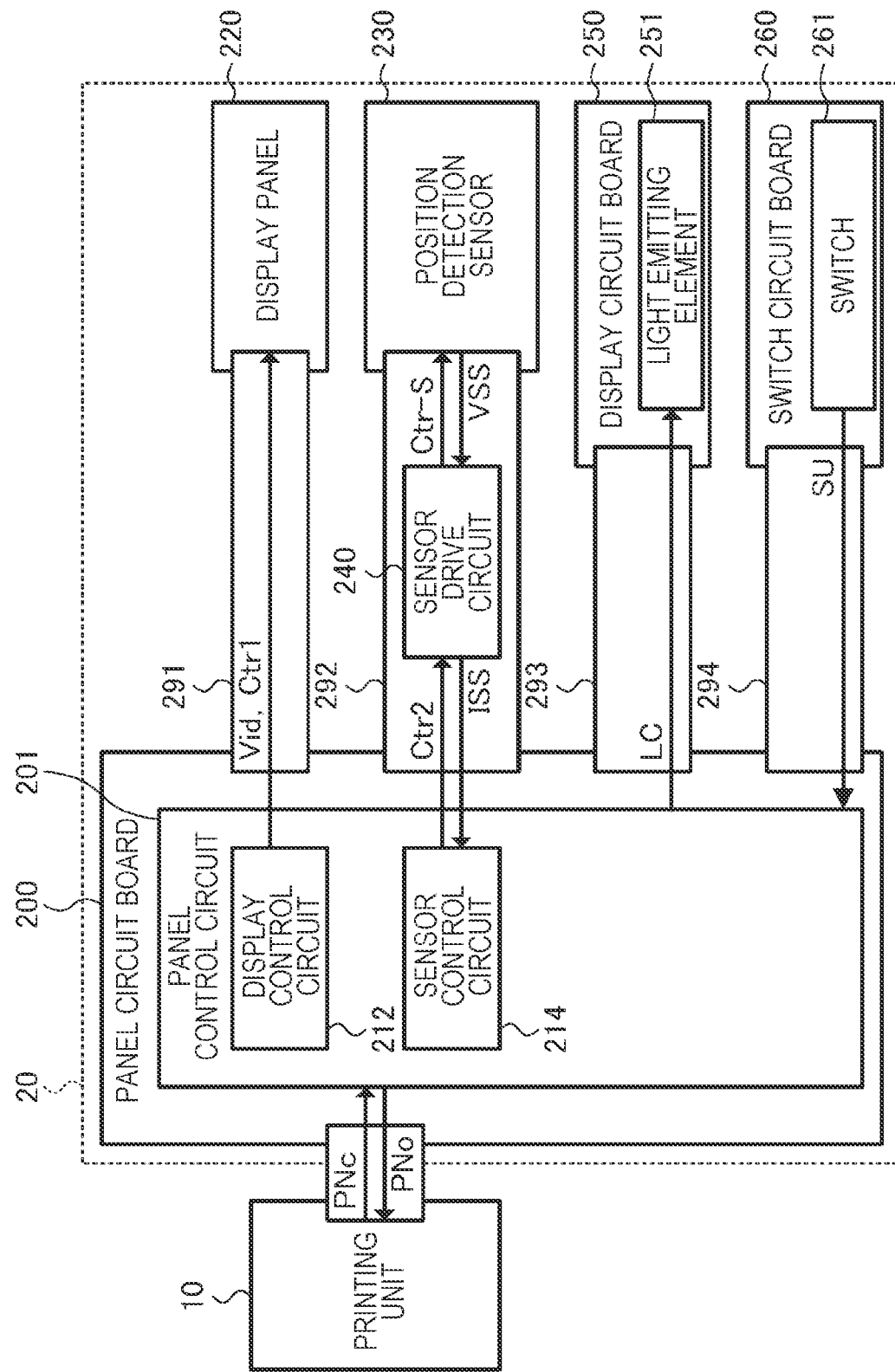
FIG. 2 is a diagram showing an example of a functional configuration of a panel unit.

Next, a functional configuration of the panel unit 20 will be described. FIG. 2 is a diagram showing an example of the functional configuration of the panel unit 20. As shown in FIG. 2, the panel unit 20 includes a panel circuit board 200, a display panel 220, a position detection sensor 230, a sensor drive circuit 240, a display circuit board 250, and a switch circuit board 260.

The panel circuit board 200 includes a panel control circuit 201. Further, the panel control circuit 201 includes a display control circuit 212 that controls the display panel 220 and a sensor control circuit 214 that controls the position detection sensor 230. Then, the panel control circuit 201 controls the display panel 220, the position detection sensor 230, the sensor drive circuit 240, the display circuit board 250, and the switch circuit board 260 based on the panel control signal PNc input from the printing unit 10, and outputs signals output by the display panel 220, the position detection sensor 230, the sensor drive circuit 240, the display circuit board 250, and the switch circuit board 260 as the panel operation signal PNo to the printing unit 10. Such a panel control circuit 201 is configured as one or more integrated circuit devices. The display circuit board 250 and the switch circuit board 260 may be electrically coupled to the relay circuit board 100 without going through the panel control circuit 201.

The display control circuit 212 outputs a control signal Ctrl that defines the operation of the display panel 220 and an image signal Vid indicating an image to be displayed on the display panel 220 to the display panel 220 via a cable 291. Thereby, the display control circuit 212 controls the display panel 220 so that an image based on the image signal Vid is displayed. Here, the image signal Vid may be an analog signal or a digital signal.

Figure 3:
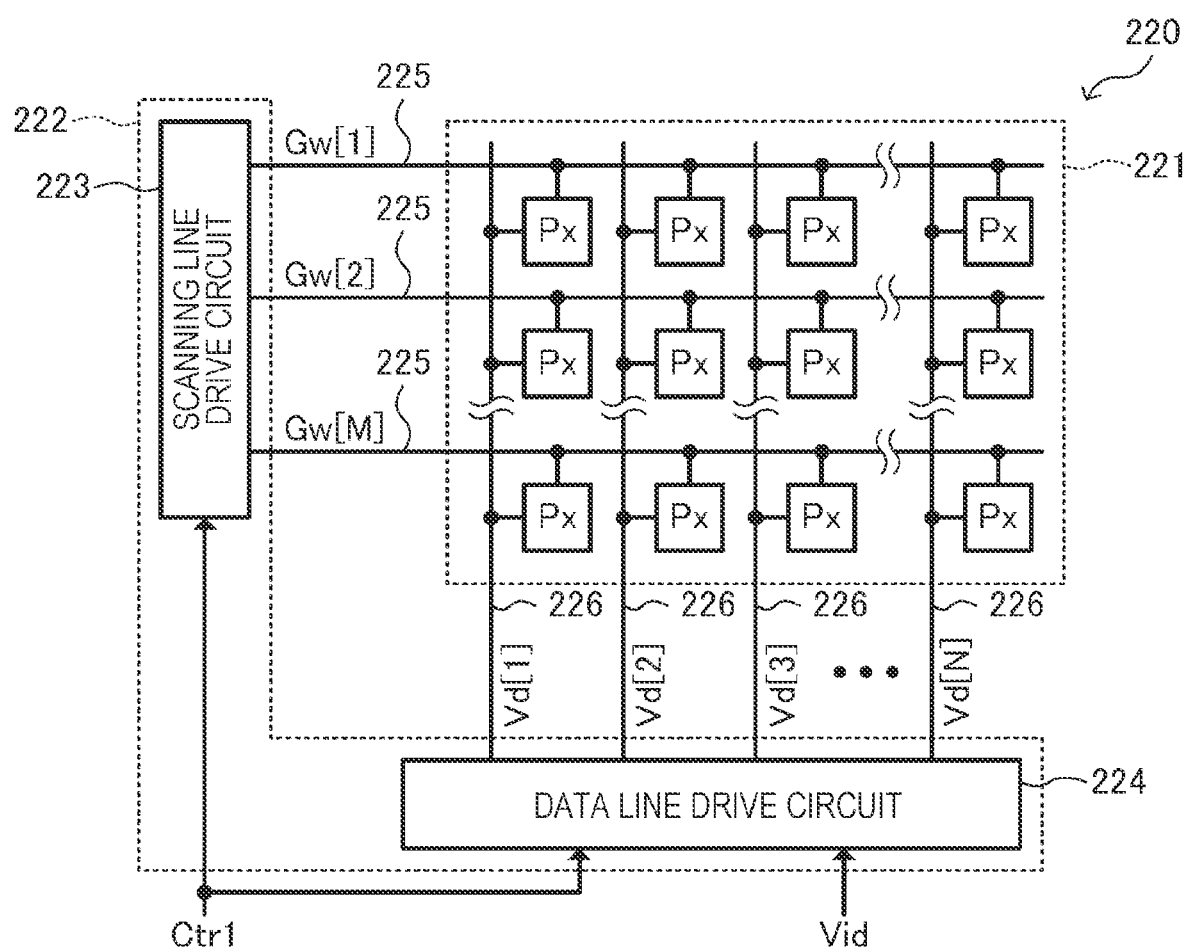
FIG. 3 is a diagram showing an example of a configuration of a display panel.

FIG. 3 is a diagram showing an example of the configuration of the display panel 220. As shown in FIG. 3, the display panel 220 includes a pixel portion 221 provided with a plurality of pixels Px, and a pixel drive portion 222 that drives the pixel portion 221.

The pixel portion 221 includes M rows of scanning lines 225 extending in a first direction, which is a horizontal direction in FIG. 3, and N columns of data lines 226 extending in a second direction, which is a vertical direction in FIG. 3 orthogonal to the first direction. Then, the pixel portion 221 includes M×N pixels Px provided in a matrix of N columns in the first direction and M rows in the second direction corresponding to intersections at which the M rows of scanning lines 225 and the N columns of data lines 226 intersect with each other.

The pixel drive portion 222 includes a scanning line drive circuit 223 and a data line drive circuit 224. The scanning line drive circuit 223 generates a selection signal Gw[m] for selecting the scanning line 225 in the m-th row based on the control signal Ctrl. Then, the scanning line drive circuit 223 outputs the selection signal Gw[m] (m is a natural number satisfying $1 \leq m \leq M$) in an m-th horizontal scanning period among M horizontal scanning periods included in a frame period defined by the control signal Ctrl. Thereby, the scanning line drive circuit 223 can sequentially select the scanning lines 225 in the first row to the M-th row in the frame period.

The data line drive circuit 224 generates a gradation designation signal Vd[n] (n is a natural number satisfying $1 \leq n \leq N$) that designates a gradation to be displayed in the pixel Px based on the image signal Vid, and outputs the gradation designation signal Vd[n] for the data line 226 in the n-th column in the m-th horizontal scanning period in which the scanning line drive circuit 223 selects the scanning line 225 in the m-th row. In the present embodiment, the image signal Vid is a signal including gradation designation signals Vd[1] to Vd[N].

In this way, in the m-th horizontal scanning period, by outputting the selection signal Gw[m] for selecting the scanning line 225 in the m-th row and outputting the gradation designation signal Vd[n] for the data line 226 in the n-th column, the pixel drive portion 222 can display the gradation designated by the gradation designation signal Vd[n] on the pixel Px in the m-th row and the n-th column. As such a display panel 220, for example, a thin flat panel such as a liquid crystal display (LCD) panel or an electro luminescence (EL) panel can be used.

Referring back to FIG. 2, the sensor control circuit 214 outputs a control signal Ctr2 that defines the operation of the sensor drive circuit 240 to the sensor drive circuit 240, which is an integrated circuit device which is chip on film (COF)-mounted on a cable 292. The sensor drive circuit 240 generates a control signal Ctr-S for controlling the drive of the position detection sensor 230 based on the input control signal Ctr2, and outputs the control signal Ctr-S to the position detection sensor 230. That is, the sensor control circuit 214 controls the drive of the position detection sensor 230 via the sensor drive circuit 240. When the position detection sensor 230 is driven by the control signal Ctr-S, the position detection sensor 230 detects the contact of an object such as a finger or a pen with the position detection sensor 230. Then, the position detection sensor 230 generates a detection signal VSS indicating a result of the detection and outputs the detection signal to the sensor drive circuit 240. The sensor drive circuit 240 calculates a contact position of the object with respect to the position detection sensor 230 based on the detection signal VSS, and generates a contact position signal ISS indicating the contact position. The sensor drive circuit 240 outputs the generated contact position signal ISS to the sensor control circuit 214.

Figure 4:
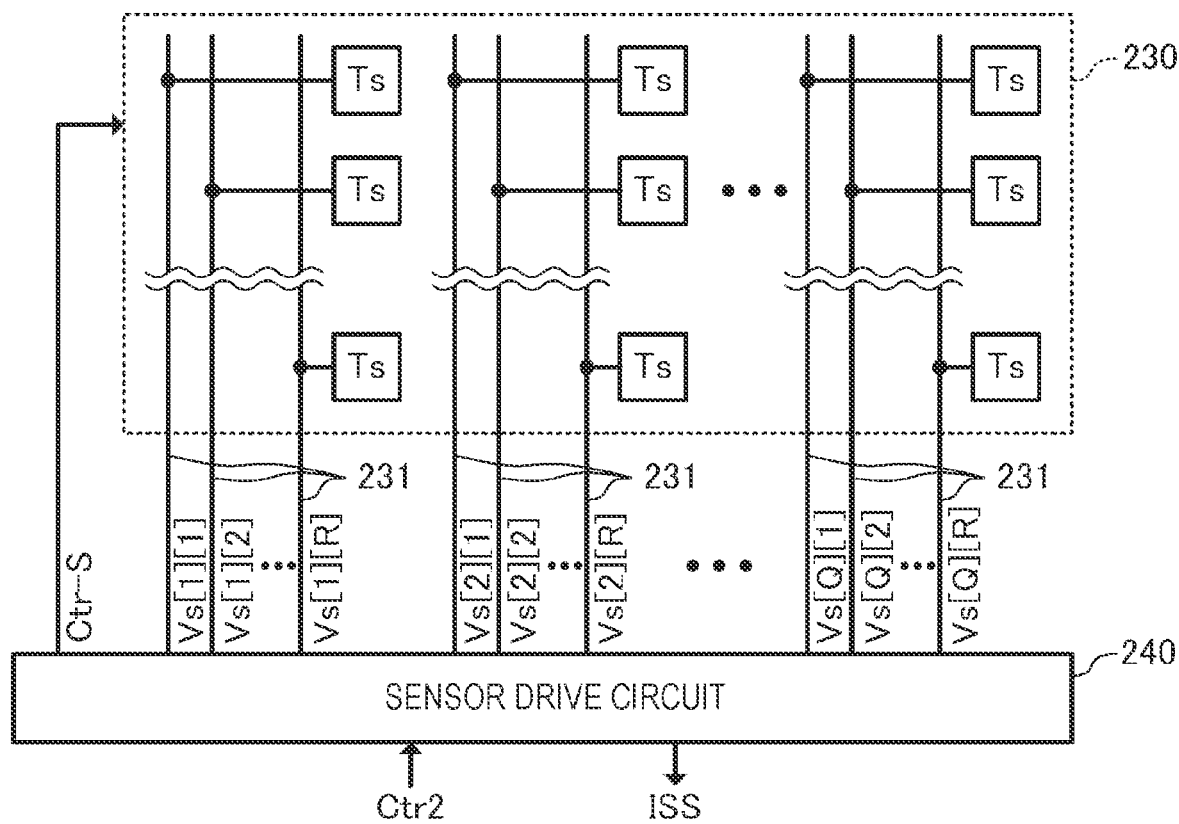
FIG. 4 is a diagram showing an example of a configuration of a position detection sensor and a sensor drive circuit.

FIG. 4 is a diagram showing an example of the configuration of the position detection sensor 230 and the sensor drive circuit 240. As shown in FIG. 4, the position detection sensor 230 includes Q×R sensors Ts provided in a matrix of Q columns in a third direction, which is the horizontal direction in FIG. 4, and R rows in a fourth direction, which is the vertical direction in FIG. 4 orthogonal to the third direction, and Q×R detection lines 231 corresponding to the Q×R sensors Ts in a one-to-one manner.

Each of sensors Ts includes a capacitive element. Then, when an object comes into contact with the sensor Ts, the potentials of two electrodes of the capacitive elements provided corresponding to the sensor Ts fluctuate.

The sensor drive circuit 240 generates a control signal Ctr-S based on the control signal Ctr2, and outputs the generated control signal Ctr-S to the position detection sensor 230. Here, the control signal Ctr-S is a signal instructing the sensor Ts[q][r] in the q-th row and r-th column to output a detection signal Vs[q][r] indicating the potential of one of the two electrodes of each sensor Ts to the detection line 231 provided corresponding to the sensor Ts[q][r].

Thereby, the sensor drive circuit 240 can receive Q×R detection signals Vs supplied from the Q×R sensors Ts. The detection signal VSS described above is, for example, a signal including Q×R detection signals Vs. Then, the sensor drive circuit 240 generates a contact position signal ISS based on the Q×R detection signals Vs included in the detection signal VSS, and outputs the generated contact position signal ISS to the panel control circuit 201. That is, the position detection sensor 230 in the present embodiment is a so-called capacitive sensor that calculates the contact position of an object according to a change in the potential of the capacitive element of the sensor Ts.

Referring back to FIG. 2, the display circuit board 250 includes a light emitting element 251. Then, the panel control circuit 201 outputs a light emission control signal LC for controlling the light emitting element 251 in the display circuit board 250. The light emitting element 251 turns on, turns off, or blinks according to the operating state of the printing device 1. That is, the light emitting element 251 is electrically coupled to the panel circuit board 200 and displays the operating states of the printing device 1 and the printing unit 10, and the display circuit board 250 includes the light emitting element 251 that displays the operating states of the printing device 1 and the printing unit 10. Although FIG. 2 shows only the case where the display circuit board 250 includes one light emitting element 251, the display circuit board 250 may include a plurality of light emitting elements 251. Further, as such a light emitting element 251, for example, a light emitting diode (LED) element can be used.

The switch circuit board 260 includes a switch 261. When the switch 261 is pressed, a switch control signal SU is supplied to the panel control circuit 201. Then, the panel control circuit 201 activates the printing device 1 according to the logic level, time, and the like of the switch control signal SU, and also stops the operation of the printing device 1. That is, the switch 261 is electrically coupled to the panel circuit board 200 and activates the printing device 1 and the printing unit 10, and the switch circuit board 260 includes the switch 261 that activates the printing device 1 and the printing unit 10.

As described above, the panel unit 20 includes the display panel 220 that displays various types of information, the position detection sensor 230 that detects the contact position of an object such as a finger or a pen, the panel circuit board 200 on which the panel control circuit 201 electrically coupled to the position detection sensor 230 and the display panel 220 is mounted, the cable 292 that electrically couples the position detection sensor 230 and the panel circuit board 200 to each other, the display circuit board 250 including the light emitting element 251 that is electrically coupled to the panel control circuit 201 mounted on the panel circuit board 200 and displays the operating state of the printing device 1 including the printing unit 10, and the switch circuit board 260 including the switch 261 that is electrically coupled to the panel control circuit 201 mounted on the panel circuit board 200 and activates the printing device 1 including the printing unit 10.

3. Structure of Printing Device

Next, the structure of the printing device 1 will be described. Here, in describing the structure of the printing device 1, the front-rear direction of the printing device 1 may be referred to as an X direction, the left-right direction of the printing device 1 may be referred to as a Y direction, and the vertical direction, which is the up-down direction of the printing device 1, may be referred to as a Z direction. Further, when the orientations of the X direction, the Y direction, and the Z direction are specified, the tip end side of the arrow indicating the X direction shown in the drawing may be referred to as a +X side, and the starting point side thereof may be referred to as a −X side, the tip end side of the arrow indicating the Y direction shown in the drawing may be referred to as a +Y side, and the starting point side thereof may be referred to as a −Y side, and the tip end side of the arrow indicating the Z direction shown in the drawing may be referred to as a +Z side, and the starting point side thereof may be referred to as a −Z side.

Figure 5:
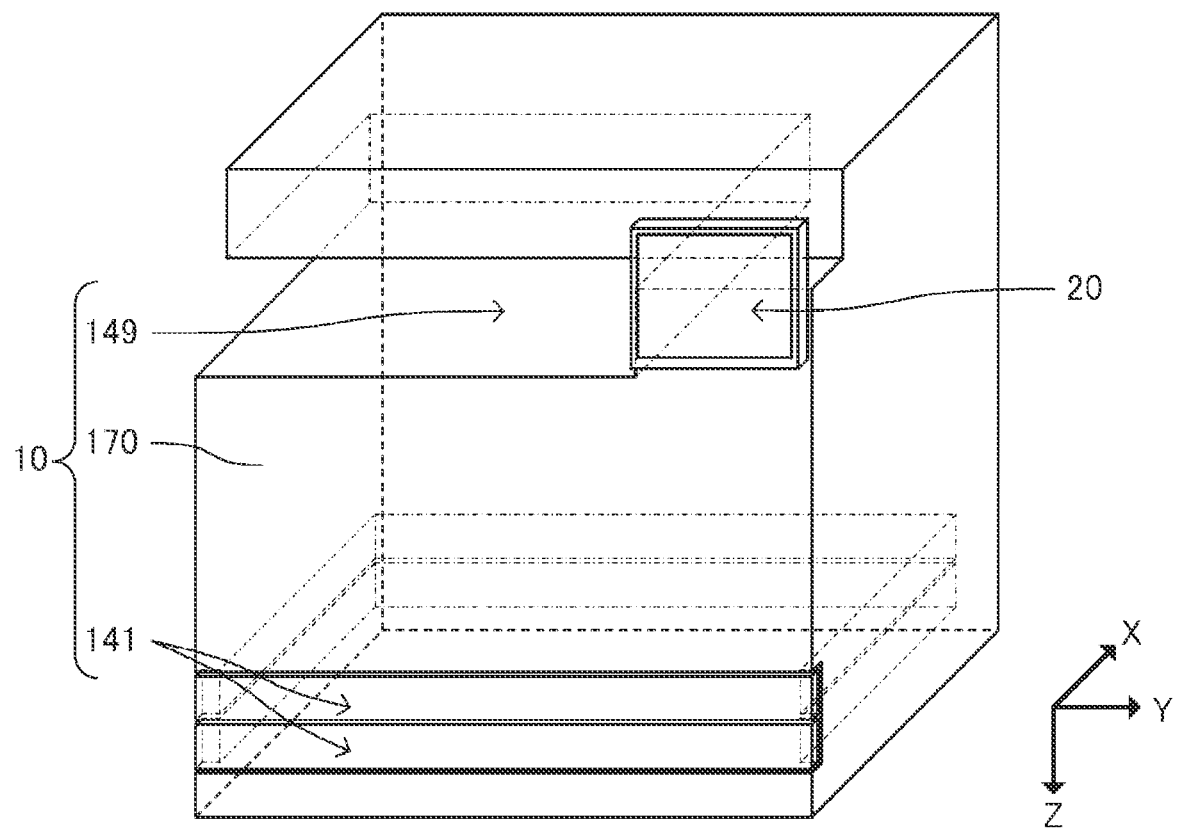
FIG. 5 is a diagram showing an external structure of the printing device.

FIG. 5 is a diagram showing an external structure of the printing device 1. As shown in FIG. 5, the printing device 1 includes the printing unit 10 and the panel unit 20.

The printing unit 10 includes a medium accommodating portion 141, a medium discharge tray 149, and a housing 170. The medium accommodating portion 141 forms an accommodating space in which the medium before the printing operation is executed is accommodated. Specifically, the medium accommodating portion 141 is located on the +Z side of the housing 170, and is attached so that at least a part of the accommodating space can be pulled out inside the housing 170. The medium discharge tray 149 is located on the −Z side of the housing 170, and the medium after the printing operation is executed is discharged.

In the printing device 1 configured as described above, when the printing operation is executed by the user operating the panel unit 20, the printing operation is executed on the medium during a period in which the medium accommodated in the medium accommodating portion 141 is transported inside the housing 170 and the medium is transported inside the housing 170. Then, the medium after the printing operation is executed is discharged to the medium discharge tray 149.

Figure 6:
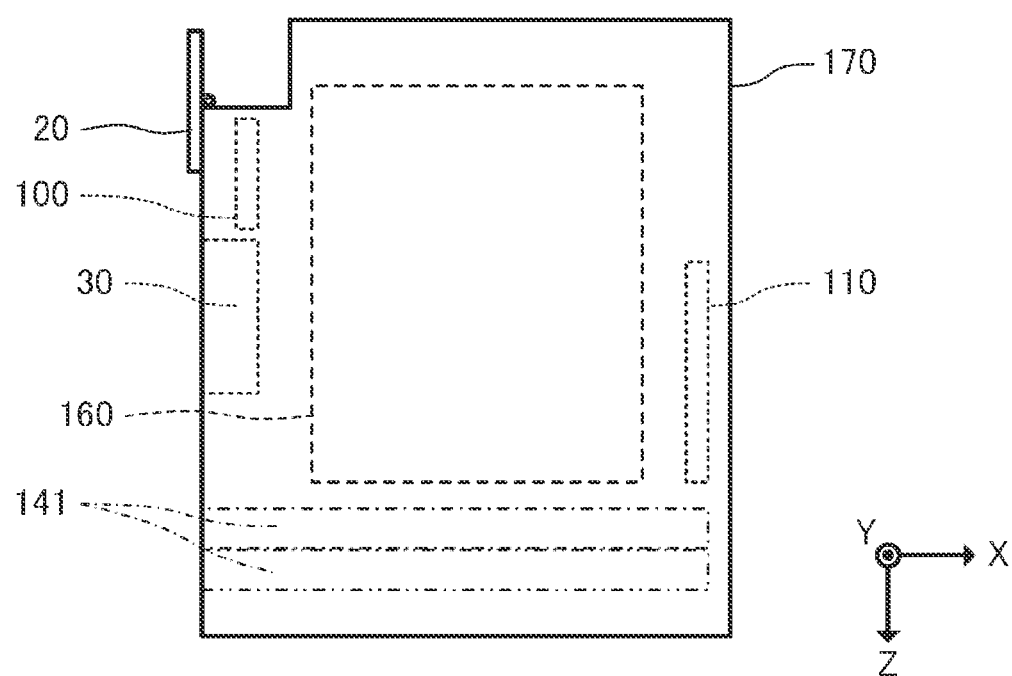
FIG. 6 is a diagram showing an example of an internal structure of a housing.

Here, the internal structure of the housing 170 included in the printing unit 10 will be described. FIG. 6 is a diagram showing an example of the internal structure of the housing 170. As shown in FIG. 6, the housing 170 stores the relay circuit board 100, the main circuit board 110, the printing mechanism 160, and the wireless communication unit 30. Specifically, the wireless communication unit 30 is located along the side surface on the −X side of the housing 170, and the relay circuit board 100 is located along the side surface on the −X side of the housing 170 and on the −Z side of the wireless communication unit 30. Further, the main circuit board 110 is located along the side surface on the +X side of the housing 170. The printing mechanism 160 that executes a printing operation on the transported medium is located between the wireless communication unit 30 and the relay circuit board 100 and the main circuit board 110.

Figure 7:
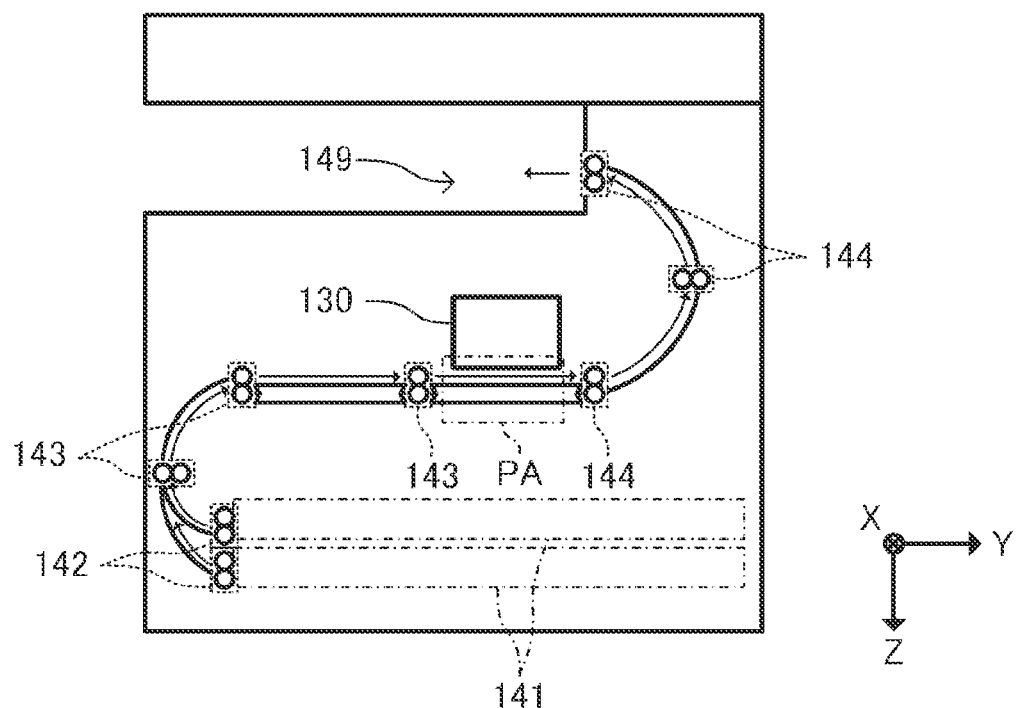
FIG. 7 is a diagram showing an example of a transport path of a medium transported by a printing mechanism.

FIG. 7 is a diagram showing an example of a transport path of the medium transported by the printing mechanism 160 provided inside the housing 170. As shown in FIG. 7, transport rollers 142, 143, and 144 are provided inside the housing 170. Each of the transport rollers 142 to 144 includes a driving roller and a driven roller, and is a pair of rollers. Then, the transport rollers 142 to 144 pinch the medium between the driving roller and the driven roller, and the driving roller is rotated by the drive of the transport motor 150 described above, so that the medium is transported along a predetermined transport direction.

Specifically, the medium accommodated in the medium accommodating portion 141 is discharged one by one by the transport roller 142. Since the transport roller 142 discharges the medium accommodated in the medium accommodating portion 141 one by one, for example, the transport roller 142 may be provided so as to apply pressure to the medium from the −Z side to the +Z side along the Z direction. The medium discharged from the medium accommodating portion 141 is transported to a print area PA facing the ejection head 130 along the transport path in a state of being pinched by the transport roller 143. When the medium reaches the print area PA, the ejection head 130 ejects ink to the medium at a timing based on the print data signal DATA. After that, the medium on which the ink has landed is transported toward the medium discharge tray 149 along the transport path in a state of being pinched by the transport roller 144, and is discharged from the inside of the housing 170 to the medium discharge tray 149.

Referring back to FIG. 5, the panel unit 20 is the side surface on the −X side of the housing 170 and is rotatably attached to the +Z side in the printing device 1.

Figure 8:
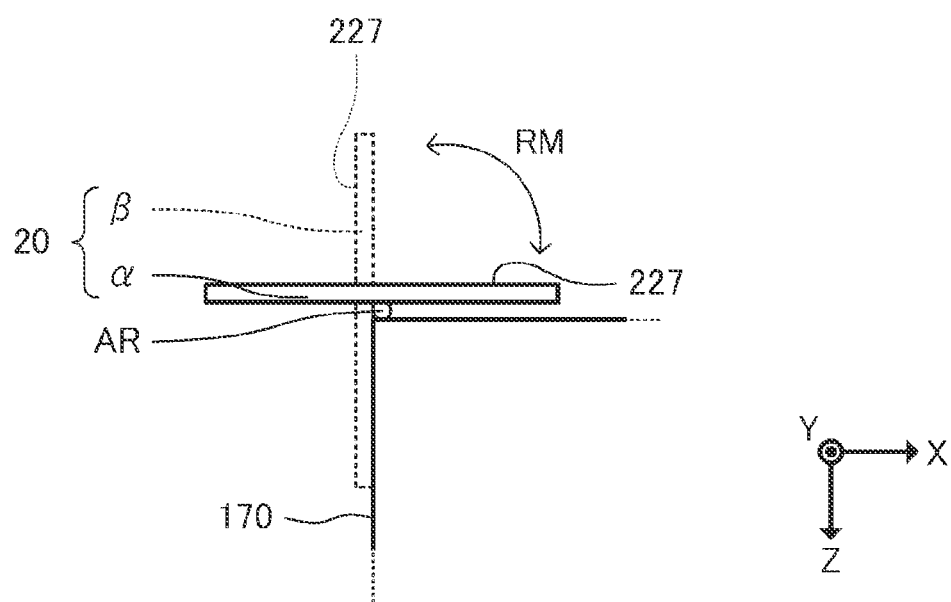
FIG. 8 is a diagram for describing an example of an attachment state of the panel unit.

FIG. 8 is a diagram for describing an example of an attachment state of the panel unit 20 attached to the housing 170. As shown in FIG. 8, the panel unit 20 is rotatably attached to the housing 170 via an attachment portion AR. Specifically, in the present embodiment, the panel unit 20 is rotatably attached to the housing 170 of the printing unit 10 with the attachment portion AR as a rotation axis within the range of a movable range RM so as to take an attachment state α in which a display surface 227 of the display panel 220 described above and the position detection sensor 230 extend along a plane formed by the X direction, which is the front-rear direction of the printing device 1, and the Y direction, which is the left-right direction of the printing device 1, and an attachment state β in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1.

That is, the panel unit 20 is rotatably attached to the housing 170 so as to take the attachment state α in which the displayed contents of the display panel 220 of the panel unit 20 can be visually recognized by the user and the contents of the display panel 220 can be visually recognized when the panel unit 20 is viewed from the upper side to the lower side of the printing device 1, that is, from the −Z side to the +Z side, and the attachment state β in which the contents of the display panel 220 can be visually recognized by the user when the panel unit 20 is viewed from the front to the rear of the printing device 1, that is, from the −X side to the +X side.

Here, in view of improving the convenience of the user who operates the printing device 1, the movable range RM of the panel unit 20 rotatably attached to the housing 170 is preferably wide, specifically, it is preferable that in the attachment state α, a normal direction of the display surface 227 of the display panel 220 and the position detection sensor 230 is upward along the substantially vertical direction and faces the +Z side of the printing device 1, and in the attachment state β, the normal direction of the display surface 227 of the display panel 220 and the position detection sensor 230 faces the −X side of the printing device 1 corresponding to the user side where the user is located in the printing device 1 along the horizontal direction.

However, the movable range RM of the panel unit 20 rotatably attached to the housing 170 is not limited to the above-mentioned range, and the information displayed on the display panel 220 of the panel unit 20 provided so as to be rotatable by the user who operates the printing device 1 may be rotatable within a visible range. Specifically, in the attachment state α, an angle formed by a plane extending in the horizontal direction and formed by the X direction and the Y direction and a direction in which the display panel 220 and the position detection sensor 230 of the panel unit 20 extend may be 45 degrees or less, and in the attachment state β, the angle formed by the plane extending in the horizontal direction and formed by the X direction and the Y direction and the direction in which the display panel 220 and the position detection sensor 230 of the panel unit 20 extend may be 45 degrees or more.

That is, the panel unit 20 may be rotatably attached to the housing 170 of the printing unit 10 so as to take the attachment state α in which the angle formed by the horizontal direction and a normal direction of the display panel 220 and the position detection sensor 230 is larger than the angle formed by the vertical direction and the normal direction of the display panel 220 and the position detection sensor 230 and the attachment state β in which the angle formed by the horizontal direction and the normal direction of the display panel 220 and the position detection sensor 230 is smaller than the angle formed by the vertical direction and the normal direction of the display panel 220 and the position detection sensor 230. Here, the attachment state a is an example of a first attachment state, and the attachment state β is an example of a second attachment state.

Figure 9:
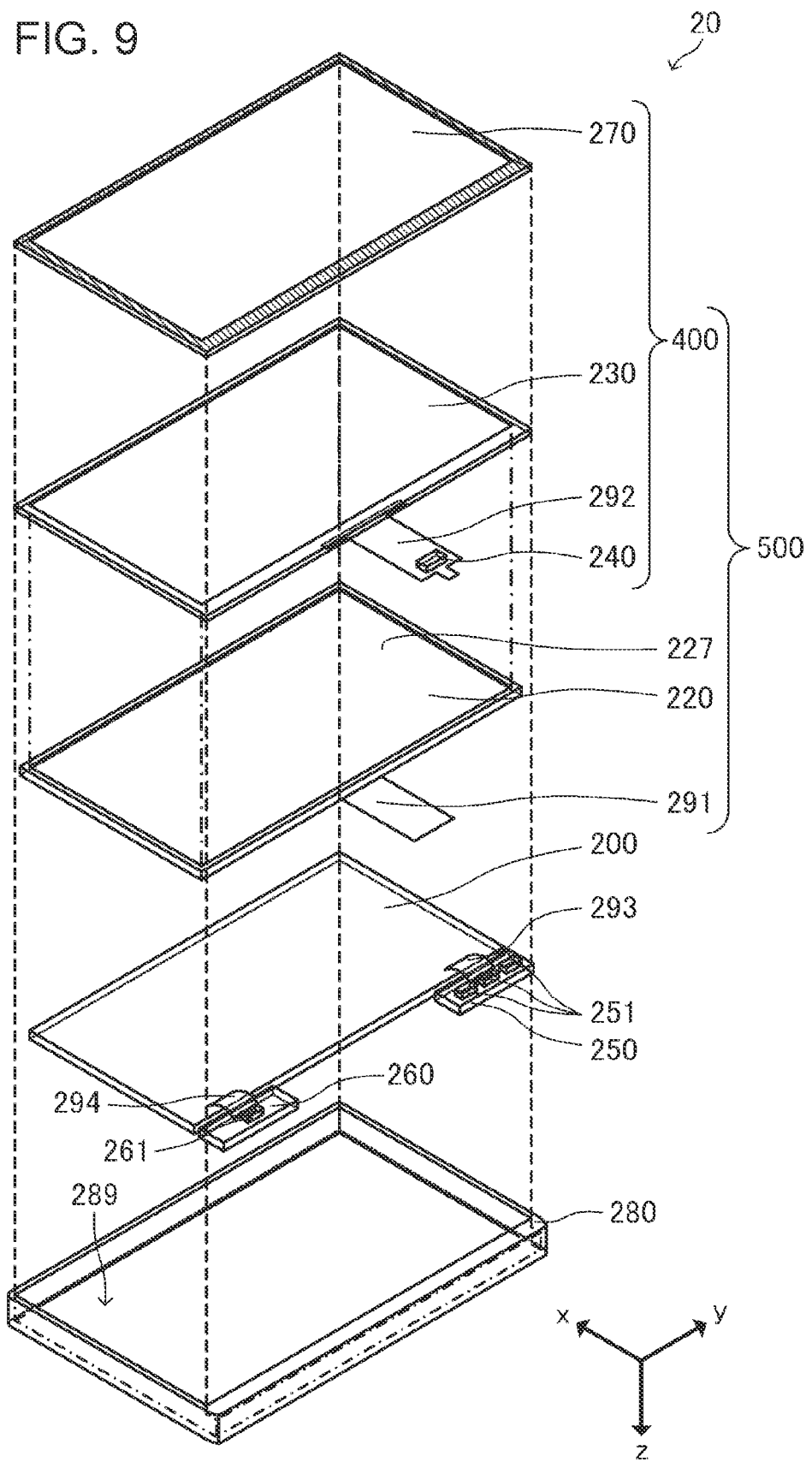
FIG. 9 is a diagram for describing a structure of a panel unit.

Next, an example of a specific structure of the panel unit 20 rotatably attached to the housing 170 as described above will be described. FIG. 9 is a diagram for describing the structure of the panel unit 20. Here, in describing the structure of the panel unit 20, in the following description, an x direction, a y direction, and a z direction which are independent of the above-mentioned X direction, Y direction, and Z direction and are orthogonal to each other are used. Further, when the orientations of the x direction, the y direction, and the z direction are specified, the tip end side of the arrow indicating the x direction shown in the drawing may be referred to as a +x side, and the starting point side thereof may be referred to as a −x side, the tip end side of the arrow indicating the y direction shown in the drawing may be referred to as a +y side, and the starting point side thereof may be referred to as a −y side, and the tip end side of the arrow indicating the z direction shown in the drawing may be referred to as a +z side, and the starting point side thereof may be referred to as a −z side.

As shown in FIG. 9, the panel unit 20 includes a cover glass 270 and a panel housing 280 in addition to the panel circuit board 200, the display panel 220, the position detection sensor 230, the display circuit board 250, and the switch circuit board 260 described above.

The position detection sensor 230 is a substantially rectangular plate-shaped member extending in a plane formed by the x direction and the y direction, and is a so-called capacitive sensor that calculates the contact position of an object according to a change in the potential of the capacitive element as described above. The cable 292 on which the sensor drive circuit 240 is COF-mounted is attached to the side of the position detection sensor 230 on the −x side.

The cover glass 270 is located on the −z side of the position detection sensor 230. The cover glass 270 is a substantially rectangular plate-shaped member having the same size as the position detection sensor 230 and extending in a plane formed by the x direction and the y direction, and is fixed to the position detection sensor 230 with an adhesive (not shown) or the like so as to be laminated. The cover glass 270 functions as a protective member that protects the position detection sensor 230 from scratches and impacts. Here, in the following description, a configuration in which the position detection sensor 230 and the cover glass 270 are laminated and fixed with an adhesive or the like is referred to as a touch sensor 400. The touch sensor 400 in which the position detection sensor 230 and the cover glass 270 are laminated is an example of a capacitive touch sensor.

Figure 10:
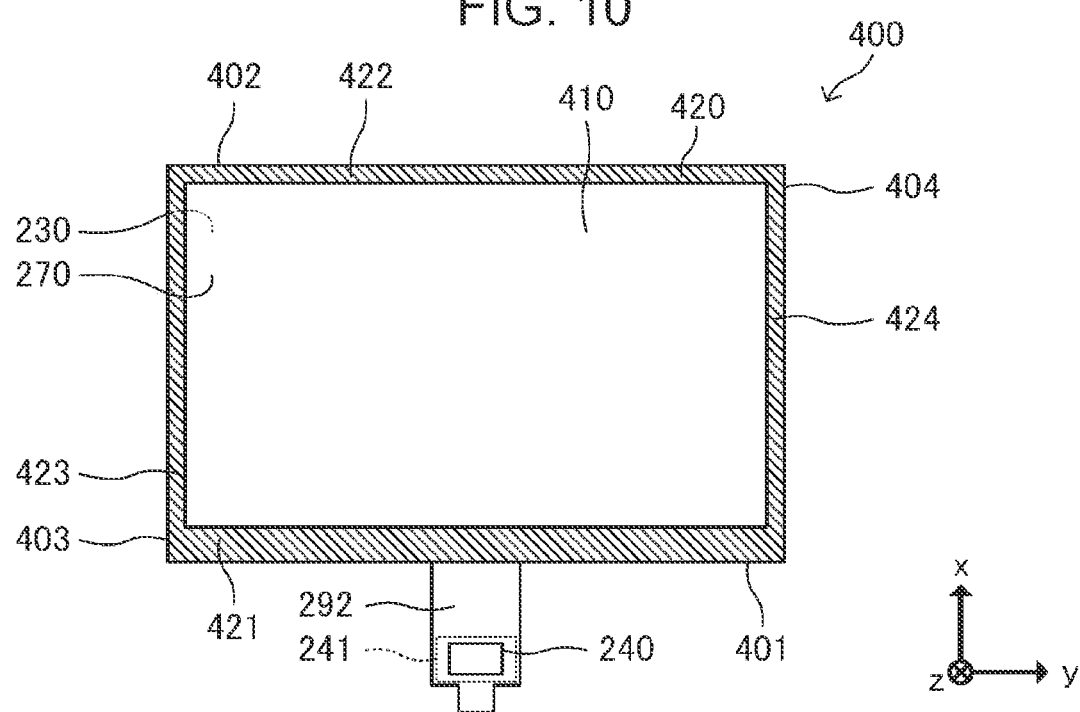
FIG. 10 is a view of a touch sensor when viewed from a −z side.
Figure 11:
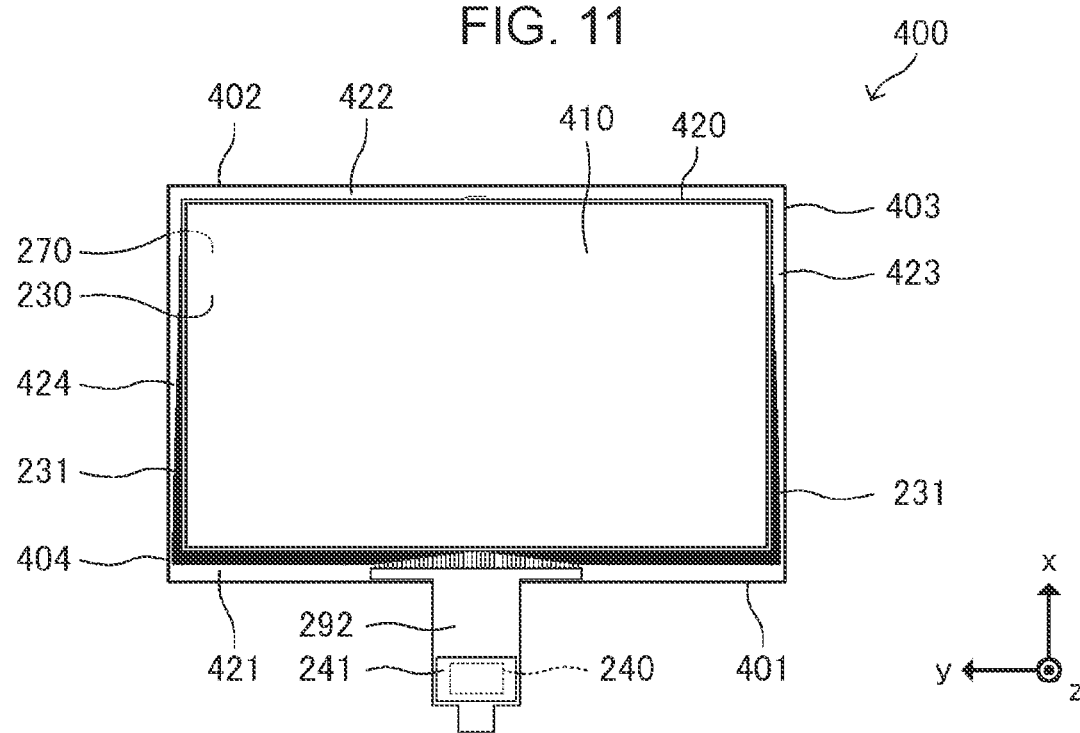
FIG. 11 is a view of the touch sensor when viewed from a +z side.

Here, an example of the structure of the touch sensor 400 will be described with reference to FIGS. 10 and 11. FIG. 10 is a view of the touch sensor 400 when viewed from the −z side, and FIG. 11 is a view of the touch sensor 400 when viewed from the +z side. That is, FIG. 10 corresponds to a view of the touch sensor 400 when viewed from the surface of the cover glass 270 side, and FIG. 11 corresponds to a view of the touch sensor 400 when viewed from the position detection sensor 230 side.

As shown in FIGS. 10 and 11, the touch sensor 400 has a substantially rectangular shape including a side 401, a side 402 located on the +x side of the side 401 and facing the side 401 along the x direction, a side 403 intersecting both the side 401 and the side 402, and, and a side 404 located on the +y side of the side 403 and facing the side 403 along the y direction. Here, the side 401 is an example of a first side, the side 402 is an example of a second side, the side 403 is an example of a third side, and the side 404 is an example of a fourth side.

As shown in FIGS. 10 and 11, the cable 292 is electrically coupled to the side 401 of the touch sensor 400. Then, the sensor drive circuit 240 is COF-mounted on the −z side surface of the cable 292 and a metal plate 241 is located in an area located facing the COF-mounted sensor drive circuit 240, which is the surface of the cable 292 on the +z side.

Further, as shown in FIGS. 10 and 11, the touch sensor 400 includes an operation area 410 that receives an input of operation information by the user and a frame area 420 that is provided around the operation area 410 and does not receive the input of the operation information by the user.

The operation area 410 is provided with transparent wiring (not shown) formed of, for example, indium tin oxide (ITO), and includes the above-described Q×R sensors Ts provided in a matrix with the x direction as the third direction and the y direction as the fourth direction. On the other hand, as shown in FIG. 11, the frame area 420 of the position detection sensor 230 is provided with a detection line 231 that electrically couples each of the Q×R sensors Ts provided in the operation area 410 to the sensor drive circuit 240. That is, in the frame area 420, a wiring for propagating the signal detected in the operation area 410 by the operation of the user is located. Further, as shown in FIG. 10, the frame area 420 of the cover glass 270 is colored, for example, black. Thereby, the boundary between the operation area 410 and the frame area 420 can be clearly notified to the user. The frame area 420 of the cover glass 270 may not be colored, or may be colored in a color other than black.

In the touch sensor 400 configured as described above, generally, from the viewpoint of securing a large operation area 410 operated by the user and from the viewpoint of the design of the panel unit 20, it is required to make the frame area 420 as narrow as possible. However, when the area of the frame area 420 provided around the operation area 410 is reduced, a possibility that disturbance noise such as static electricity will enter from the end of the cover glass 270 is increased, and as a result, a possibility that the position detection sensor 230 may malfunction is increased.

In response to such a problem, in the touch sensor 400 of the present embodiment, in the frame area 420, a size of a frame area 421 located along the side 401 in the x direction is made larger than a size of a frame area 422 located along the side 402 in the x direction, the size of the frame area 421 located along the side 401 in the x direction is made larger than a size of a frame area 423 located along the side 403 in the y direction, or the size of the frame area 421 located along the side 401 in the x direction is made larger than a size of a frame area 424 located along the side 404 in the y direction. That is, the frame area 420 provided along at least one side in the frame area 420 that is provided around the operation area 410 and does not receive the input of the operation information by the user is made larger than the frame area 420 provided along the other side. Thereby, it is possible to reduce the possibility that disturbance noise such as static electricity will enter from the vicinity of the side 401 while reducing the possibility that the area of the operation area 410 becomes small.

Here, the frame area 421 is an example of a first frame area, the frame area 422 is an example of a second frame area, the frame area 423 is an example of a third frame area, and the frame area 424 is an example of a fourth frame area.

Referring back to FIG. 9, the display panel 220 is located on the +z side of the position detection sensor 230 so that the display surface 227 is on the −z side. Such a display panel 220 is a substantially rectangular plate-shaped member extending in a plane formed by the x direction and the y direction, and the size of the display surface 227 of the display panel 220 overlaps at least the operation area 410. Then, in the display panel 220, the entire area of the operation area 410 overlaps the display surface 227 in the direction along the z direction. That is, the position detection sensor 230 and the display panel 220 are laminated along the z direction. In addition, the cable 291 electrically coupled to the panel circuit board 200 is electrically coupled to the side of the display panel 220 on the −x side.

Here, in the following description, a configuration in which the touch sensor 400 including the position detection sensor 230 and the display panel 220 are laminated along the z direction is referred to as a touch panel 500. In the present embodiment, as described above, the position detection sensor 230 is a capacitive sensor. That is, the touch sensor 400 in the present embodiment is a capacitive touch sensor, and the touch panel 500 including the touch sensor 400, which is a capacitive touch sensor, and the display panel 220 is a capacitive touch panel. That is, the touch sensor 400 of the panel unit 20 of the present embodiment has a configuration in which the position detection sensor 230 and the cover glass 270 are laminated, and the touch panel 500 has a configuration in which the position detection sensor 230, the cover glass 270, and the display panel 220 are laminated.

The panel circuit board 200 is located on the +z side of the display panel 220. Then, the panel control circuit 201 in the panel circuit board 200 controls the operation of the touch panel 500 including the display panel 220 and the position detection sensor 230. Specifically, the panel circuit board 200 is electrically coupled to the display panel 220 via the cable 291 and is electrically coupled to the position detection sensor 230 via the cable 292. Then, the panel control circuit 201 provided on the panel circuit board 200 controls the operation of the display panel 220 via the cable 291 and controls the operation of the position detection sensor 230 via the cable 292.

The display circuit board 250 is located on the −x side of the panel circuit board 200. Three light emitting elements 251 are provided on the surface of the display circuit board 250 on the −z side. Further, the switch circuit board 260 is located on the −x side of the panel circuit board 200 and on the −y side of the display circuit board 250. The switch 261 is provided on the surface of the switch circuit board 260 on the −z side. The display circuit board 250 is electrically coupled to the panel circuit board 200 via a cable 293, and the switch circuit board 260 is electrically coupled to the panel circuit board 200 via a cable 294.

The panel housing 280 has a substantially rectangular parallelepiped shape having a storage space 289 with one surface on the −z side open, and is composed of a forming member obtained by molding, for example, resin or the like. The touch panel 500, the panel circuit board 200, the display circuit board 250, and the switch circuit board 260 described above are stored in the storage space 289 of the panel housing 280. In this case, the cover glass 270 of the touch panel 500 is provided so as to cover an open surface of the storage space 289.

Figure 12:
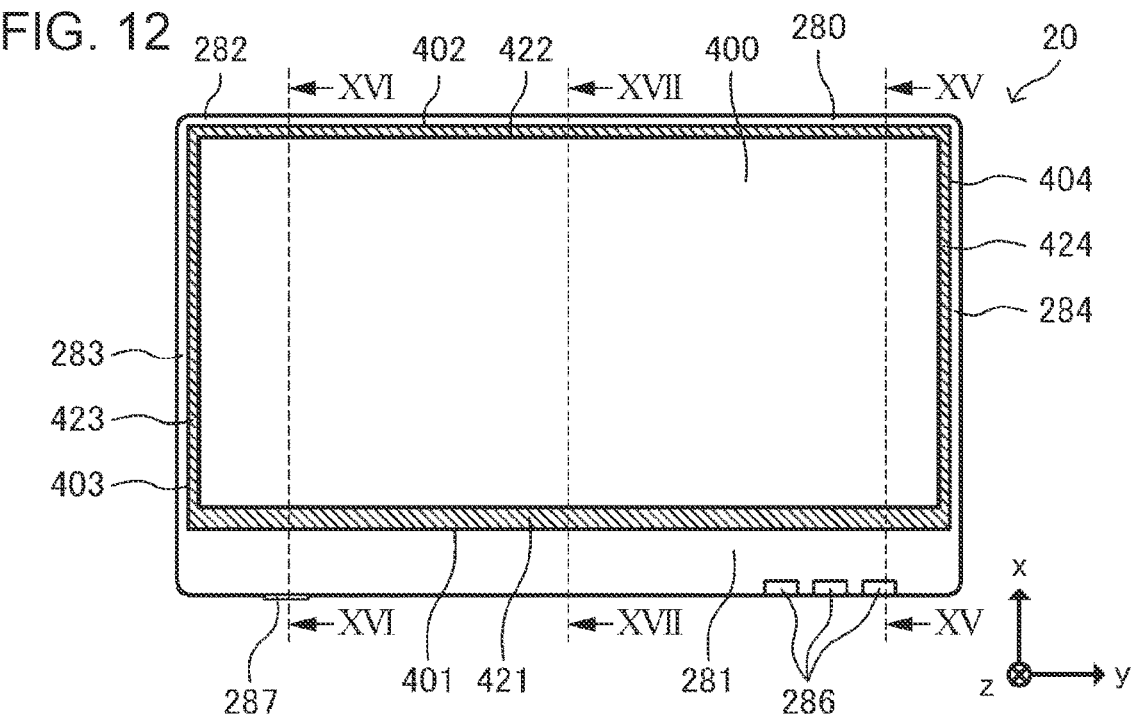
FIG. 12 is a view of the panel unit when viewed from the −z side.
Figure 13:
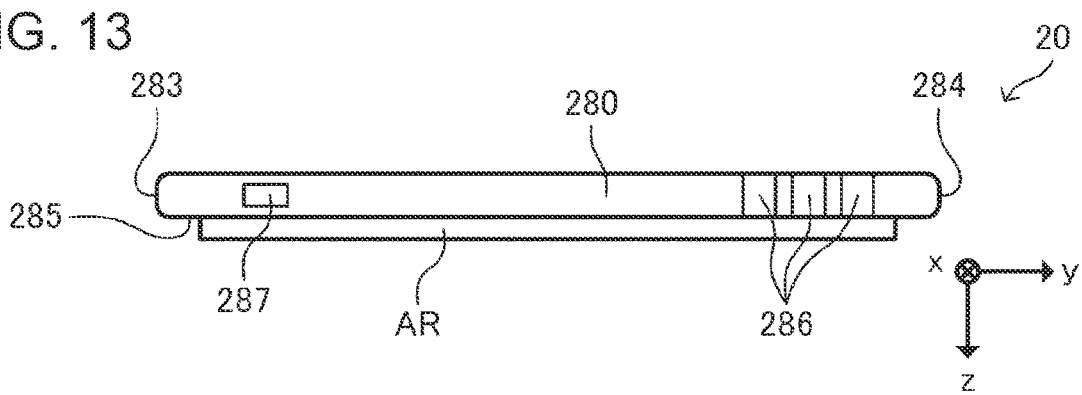
FIG. 13 is a view of the panel unit when viewed from a −x side.
Figure 14:
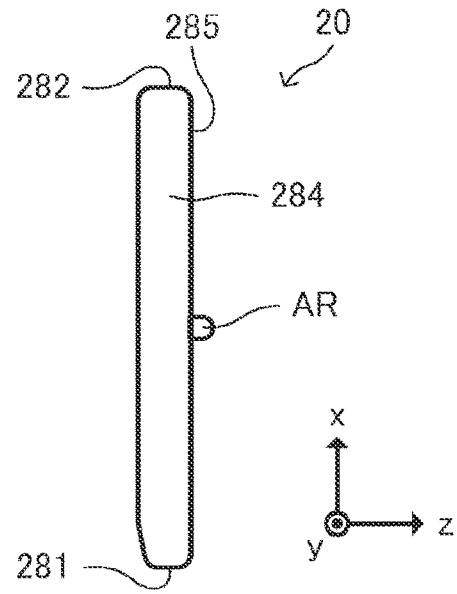
FIG. 14 is a view of the panel unit when viewed from a +y side.

Here, the structure of the panel unit 20 in a state where the position detection sensor 230, the display panel 220, the panel circuit board 200, the display circuit board 250, and the switch circuit board 260 are stored in the panel housing 280 will be described. FIG. 12 is a view of the panel unit 20 when viewed from the −z side, FIG. 13 is a view of the panel unit 20 when viewed from the −x side, and FIG. 14 is a view of the panel unit 20 when viewed from the +y side.

As shown in FIG. 12, the touch sensor 400 is stored in the panel housing 280 so that the side 401 and the side 402 face each other along the x direction so that the side 401 is on the −x side and the side 402 is on the +x side, and the side 403 and the side 404 face each other along the y direction so that the side 403 is on the −y side and the side 404 is on the +y side. In other words, the touch sensor 400 is stored in the panel housing 280 so that the frame area 421 and the frame area 422 face each other along the x direction so that the frame area 421 is on the −x side and the frame area 422 is on the +x side, and the frame area 423 and the frame area 424 face each other along the y direction so that the frame area 423 is on the −y side and the frame area 424 is on the +y side.

As shown in FIG. 12, the panel housing 280 includes a housing side portion 281 including a side surface extending along the side 401 of the touch sensor 400 to be stored, a housing side portion 282 including a side surface extending along the side 402 of the touch sensor 400 to be stored, a housing side portion 283 including a side surface extending along the side 403 of the touch sensor 400 to be stored, and a housing side portion 284 including a side surface extending along the side 404 of the touch sensor 400 to be stored. That is, the storage space 289 of the panel housing 280 includes at least the housing side portions 281, 282, 283, and 284.

Then, as shown in FIG. 12, a size of the housing side portion 281 in the direction from the side 401 to the side 402 and in the direction along the x direction is larger than a size of the housing side portion 282 in the direction from the side 401 to the side 402 and in the direction along the x direction, a size of the housing side portion 283 in the direction from the side 403 to the side 404 and in the direction along the y direction is smaller than the size of the housing side portion 281 in the direction from the side 401 to the side 402 and in the direction along the x direction, and a size of the housing side portion 282 in the direction from the side 403 to the side 404 and in the direction along the y direction is smaller than the size of the housing side portion 281 in the direction from the side 401 to the side 402 and in the direction along the x direction. That is, the size of the housing side portion 281 located along the largest frame area 421 in the frame area 420 of the touch sensor 400 is larger than the size of each of the housing side portions 282, 283, and 284.

Here, the housing side portion 281 is an example of a first side portion, the housing side portion 282 is an example of a second side portion, the housing side portion 283 is an example of a third side portion, and the housing side portion 284 is an example of a fourth side portion.

Further, as shown in FIGS. 13 and 14, in the panel unit 20, the attachment portion AR is provided at the central portion of a bottom surface 285 of the panel housing 280 located facing the cover glass 270. Specifically, in the panel unit 20 including the panel housing 280 in which the touch sensor 400 is stored, the attachment portion AR is a protrusion that is located at the central portion of the panel housing 280 in the direction from the side 401 to the side 402, that is, the direction along the x direction, and extends along the y direction. The panel unit 20 is rotatably attached to the printing unit 10 by rotatably attaching the attachment portion AR to the housing 170. That is, the panel unit 20 is rotatably attached to the printing unit 10 at the central portion of the panel housing 280 in the direction from the side 401 to the side 402.

Here, the fact that the attachment portion AR is located at the central portion of the panel housing 280 in the direction from the side 401 to the side 402, that is, the direction along the x direction means that, preferably, when the panel unit 20 is viewed along the z direction, at least a part of the attachment portion AR is located so as to overlap a point where a distance between the side surface on the −x side and the side surface on the +x side of the panel housing 280 is equal. However, the attachment portion AR may be located at least in an area between a first virtual straight line where a distance between a virtual straight line having the same distance between the side surface on the −x side and the side surface on the +x side of the panel housing 280 and the side surface on the −x side of the panel housing 280 is equal and a second virtual straight line where a distance between the virtual straight line having the same distance between the side surface on the −x side and the side surface on the +x side of the panel housing 280 and the side surface on the +x side of the panel housing 280 is equal.

That is, the central portion of the panel housing 280 in the direction from the side 401 to the side 402, that is, the direction along the x direction means the area between the above-mentioned first virtual straight line and the above-mentioned second virtual straight line.

Then, the panel unit 20 and the printing unit 10 are electrically coupled to each other by inserting the cable 210 into the attachment portion AR. That is, the panel circuit board 200 and the main circuit board 110 are electrically coupled to each other by a cable 210 which is a wiring for inserting the inside of the attachment portion AR to which the panel unit 20 is rotatably attached to the printing unit 10.

Further, as shown in FIGS. 12 and 13, a display window 286 and an operation switch 287 are provided on the housing side portion 281 of the panel housing 280.

The display window 286 is a resin member that transmits light, for example, a transparent color or a milky white color, and is located on the +y side of the housing side portion 281 so that at least a part of the panel unit 20 can be visually recognized when the panel unit 20 is viewed from the −z side along the z direction. In the storage space 289 of the panel housing 280 where the display window 286 is located, the light emitting element 251 of the display circuit board 250 stored in the panel housing 280 is located. Then, when the light emitting element 251 is turned on, turned off, or blinks according to the operating state of the printing device 1, the light generated by the light emitting element 251 is notified to the outside of the panel unit 20 via the display window 286.

Figure 15:
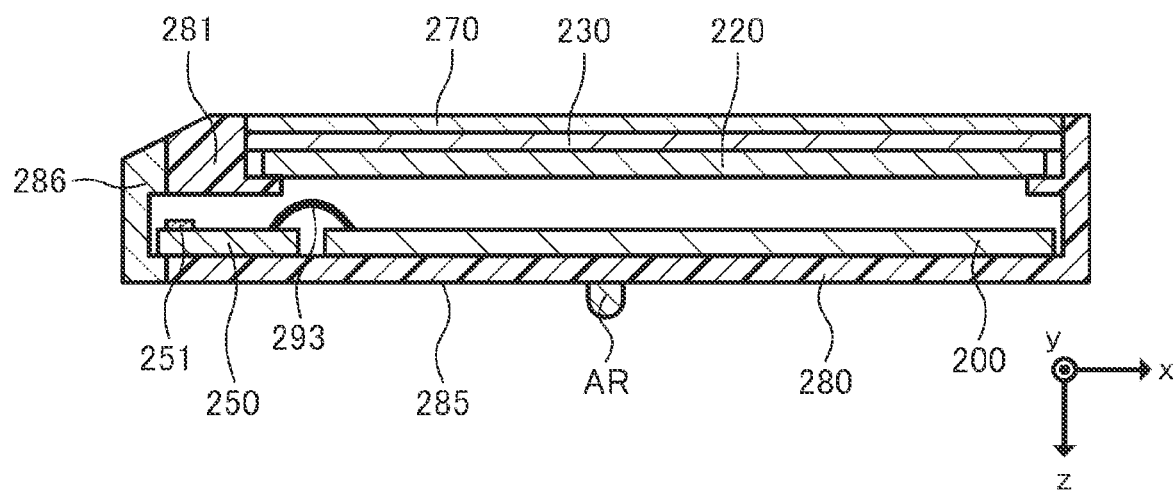
FIG. 15 is a diagram showing a cross section taken along line XV-XV of FIG. 12.

FIG. 15 is a diagram showing an example of a cross section of the panel unit 20 when the panel unit 20 is cut so as to pass through the display window 286 and the light emitting element 251, and is a diagram showing a cross section taken along line XV-XV of FIG. 12. As shown in FIG. 15, the display circuit board 250 is in the vicinity of the side surface on the −x side of the panel housing 280, and at least a part thereof is located inside the housing side portion 281. In addition, the display window 286 is provided on the side surface on the −x side of the housing side portion 281, corresponding to the light emitting element 251 so that at least a part thereof can be visually recognized from the −z side. Thereby, the user can recognize the turning-on, turning-off, or blinking of the light emitting element 251 via the display window 286, and can grasp the operating state of the printing device 1 notified by turning on, turning off, or blinking the light emitting element 251. That is, when the panel unit 20 is viewed in the direction along a normal direction of the touch sensor 400, the display window 286 and the light emitting element 251 are provided at positions where the displayed contents can be visually recognized. Thereby, even though the panel unit 20 is rotatable, the user can grasp the operating state of the printing device 1 based on the turning-on, turning-off, or blinking of the light emitting element 251. That is, the display circuit board 250 is electrically coupled to the main circuit board 110 of the printing unit 10 via the panel circuit board 200.

Here, in FIG. 15, it has been described that the display circuit board 250 including the light emitting element 251 and the panel circuit board 200 are coupled to each other via the cable 293, but the display circuit board 250 and the panel circuit board 200 are connectors that directly couple the circuit boards to each other, and may be electrically coupled with a board to board (BtoB) connector.

As shown in FIG. 15, when the display circuit board 250 and the panel circuit board 200 are electrically coupled to each other by a wiring such as a flexible flat cable, the display circuit board 250 and the panel circuit board 200 can be coupled in a space-saving manner. However, the disposition of the display circuit board 250 may be misaligned, and as a result, a sufficient amount of light may not be extracted from the display window 286. On the other hand, by electrically coupling the display circuit board 250 and the panel circuit board 200 with a BtoB connector, the disposition of the display circuit board 250 provided with the light emitting element 251 is uniquely determined based on the disposition of the panel circuit board 200, and as a result, a possibility of misalignment of the display circuit board 250 is reduced.

Further, in the present embodiment, the display circuit board 250 and the panel circuit board 200 have been described as different boards, but the display circuit board 250 and the panel circuit board 200 may be the same board.

Referring back to FIGS. 12 and 13, the operation switch 287 is located on the side surface of the panel housing 280 extending in a direction intersecting the extending direction of the display surface 227 of the display panel 220, which is the end of the panel housing 280 when the panel unit 20 is viewed from the −z side along the z direction and when viewed from the direction along the normal direction of the touch sensor 400. Then, when the user operates the operation switch 287, the switch 261 of the switch circuit board 260 operates, whereby operation information of the user is input to the panel unit 20.

Figure 16:
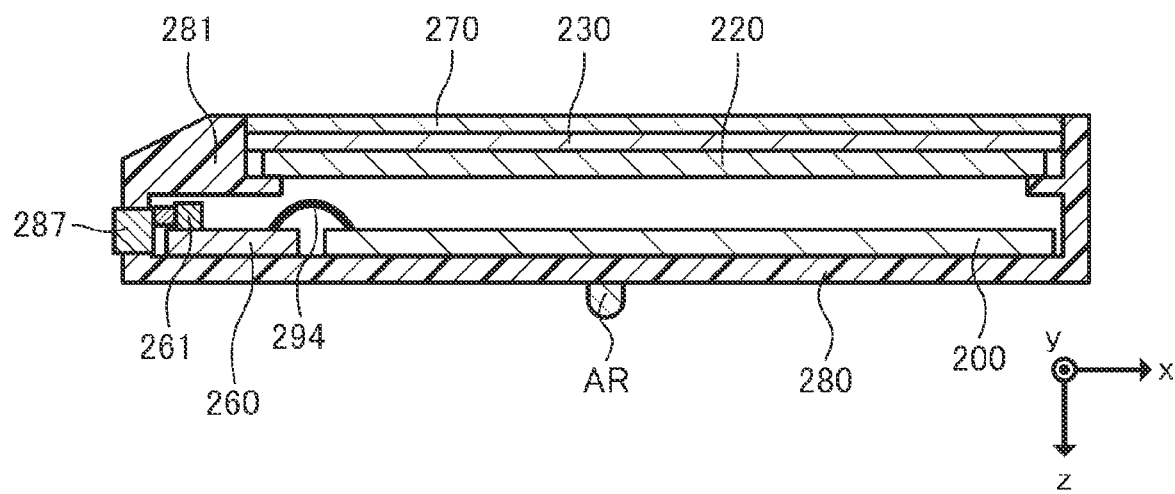
FIG. 16 is a diagram showing a cross section taken along line XVI-XVI of FIG. 12.

FIG. 16 is a diagram showing an example of a cross section of the panel unit 20 when the panel unit 20 is cut so as to pass through the operation switch 287 and the switch 261, and is a diagram showing a cross section taken along line XVI-XVI of FIG. 12. As shown in FIG. 16, the switch circuit board 260 is in the vicinity of the side surface on the −x side of the panel housing 280, and at least a part thereof is located inside the housing side portion 281. In addition, the operation switch 287 is in contact with the switch 261 inside the housing side portion 281. Thereby, when the user presses the operation switch 287, the switch 261 is pressed in conjunction with the pressing of the operation switch 287. Then, the logic level switch control signal SU generated when the switch 261 is pressed is supplied to the panel control circuit 201 via the cable 294. Thereby, the printing device 1 starts a predetermined operation when the user presses the operation switch 287.

Further, the touch sensor 400 and the panel circuit board 200 are located in the vicinity of the housing side portion 281 which is the end of the panel housing 280, and are electrically coupled to each other by the cable 292 between the display circuit board 250 and the switch circuit board 260.

Figure 17:
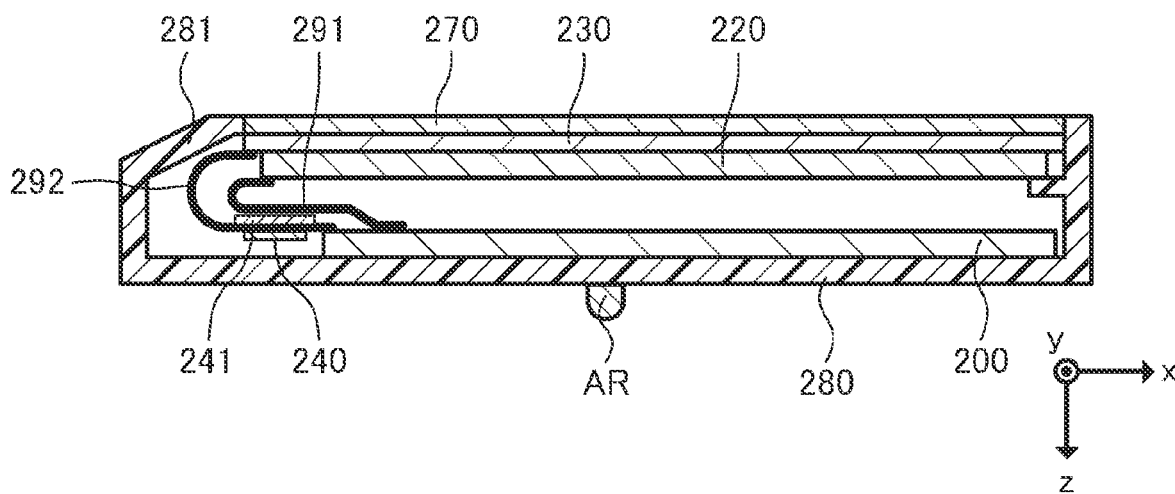
FIG. 17 is a diagram showing a cross section taken along line XVII-XVII of FIG. 12.

FIG. 17 is a diagram showing an example of a cross section of the panel unit 20 when the panel unit 20 is cut so as to pass through the cable 292, and is a diagram showing a cross section taken along line XVII-XVII of FIG. 12. As shown in FIG. 17, the cable 292 is located in the vicinity of the side surface on the −x side of the panel housing 280 and at least a part thereof is curved inside the housing side portion 281 to electrically couple the touch sensor 400 and the panel circuit board 200 provided in a laminated manner to each other. In other words, the cable 292 is located between the light emitting element 251 and the switch 261 in the direction along the side 401 of the panel unit 20 and is curved to electrically couple the touch sensor 400 and the panel circuit board 200 to each other.

In this case, the sensor drive circuit 240 which is COF-mounted on the cable 292 is mounted on the outer peripheral side of the curved cable 292, and the metal plate 241 is located in an area facing the sensor drive circuit 240 which is COF-mounted on the cable 292 and on the inner peripheral side of the curved cable 292. Then, when the detection signal VSS generated by the contact of an object such as a finger or a pen with the touch sensor 400 is input to the sensor drive circuit 240, the sensor drive circuit 240 generates the contact position signal ISS based on the detection signal VSS and outputs the contact position signal ISS to the sensor control circuit 214 in the panel control circuit 201.

As described above, at least parts of the display circuit board 250 including the light emitting element 251, the switch circuit board 260 including the switch 261, and the cable 292 that electrically couples the touch sensor 400 and the panel circuit board 200 to each other are provided on the housing side portion 281 of the panel housing 280, and the switch circuit board 260, the cable 292, and the display circuit board 250 are located side by side in this order along the side 401 of the touch sensor 400 and along the y direction, which is the direction from the side 403 to the side 404.

Then, the switch circuit board 260 has one side located along the housing side portion 283 of the panel housing 280, the display circuit board 250 has one side located along the housing side portion 284 of the panel housing 280, and the cable 292 is located at the central portion of the panel housing 280 in the direction from the housing side portion 283 to the housing side portion 284. In other words, the cable 292 is located at the central portion of the panel housing 280 in the direction from the side 403 to the side 404, the switch circuit board 260 is located closer to the side 403 than the cable 292, and the display circuit board 250 is located closer to the side 404 than the cable 292.

As described above, when the switch circuit board 260, the cable 292, and the display circuit board 250 are disposed side by side in order of the switch circuit board 260, the cable 292, and the display circuit board 250 along the housing side portion 281 of the panel housing 280, the operation switch 287 operated by the user and the display window 286 for notifying the user of information can be provided separately. Thereby, the possibility that the user erroneously recognizes the operation switch 287 and the display window 286 is reduced, and the usability of the printing device 1 is improved.

Further, when the cable 292 is disposed between the switch circuit board 260 and the display circuit board 250, the switch circuit board 260 is disposed near the side 403 and near the housing side portion 283, the display circuit board 250 is disposed near the side 404 and near the housing side portion 284, and the cable 292 is disposed at the central portion of the panel housing 280 in the direction from the housing side portion 283 to the housing side portion 284, mutual interference of signals between the switch circuit board 260, the display circuit board 250, and the cable 292 is reduced. As a result, a possibility of malfunction of the panel unit 20 and the printing device 1 is reduced.

As described above, the panel unit 20 includes the display panel 220, the touch sensor 400 in which the position detection sensor 230 and the cover glass 270 are laminated, the panel circuit board 200 electrically coupled to the touch sensor 400, the cable 292 that electrically couples the touch sensor 400 and the panel circuit board 200 to each other, the light emitting element 251 that is electrically coupled to the panel circuit board 200 and displays the operating state of the printing unit 10, the switch 261 that is electrically coupled to the panel circuit board 200 and activates the printing unit 10, and the panel housing 280 that stores the touch sensor 400, the panel circuit board 200, and the cable 292.

The panel unit 20 configured as described above is attached to the printing unit 10 so that the side 401 of the touch sensor 400 is located on the −X side and the side 402 of the touch sensor 400 is located on the +X side in the attachment state α in which the display surface 227 of the display panel 220 and the position detection sensor 230 extend along a plane formed by the X direction, which is the front-rear direction of the printing device 1, and the Y direction, which is the left-right direction of the printing device 1, and is attached to the printing unit 10 so that the side 401 of the touch sensor 400 is located on the +Z side and the side 402 of the touch sensor 400 is located on the −Z side in the attachment state β in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1. That is, when the panel unit 20 is in the attachment state β, the touch sensor 400 included in the touch panel 500 is disposed so that the side 401 is lower than the side 402 in the direction along the vertical direction. Thereby, the widest frame area 421 in the frame area 420 that is provided around the operation area 410 in the touch sensor 400 and does not receive the input of operation information by the user is located on the −X side in the attachment state α and on the +Z side in the attachment state β.

Here, in the printing device 1 as shown in FIG. 5, when the user operates the panel unit 20, usually, the user operates the panel unit 20 by locating in front of the panel unit 20 and on the −X side of the printing device 1. That is, with the printing device 1 according to the present embodiment, when the panel unit 20 is in the attachment state β, the touch sensor 400 included in the touch panel 500 is disposed so that the side 401 is lower than the side 402 in the direction along the vertical direction. Thereby, the widest frame area 421 in the frame area 420 that is provided around the operation area 410 in the touch sensor 400 and does not receive the input of operation information by the user is located closest to the user.

When the user operates the panel unit 20, at the end of the panel unit 20 on the user side, the user's clothes, the hypothenar eminence of the hand, the thumb ball, and the like unintentionally come into contact with the panel unit 20, which causes disturbance noise such as static electricity in the panel unit 20. In particular, when the user operates the panel unit 20, there is a high possibility that an unintended contact between the user and the panel unit 20 occurs at the end of the panel unit 20 on the user side. Therefore, a possibility that disturbance noise such as static electricity is generated at the end of the panel unit 20 on the user side is higher than that of the other end. By making the size of the frame area 420 located along the end on the user side where such disturbance noise such as static electricity is likely to occur larger than the size of the frame area 420 located along the other end, when static electricity is generated in the panel unit 20, even in the case where the static electricity enters the inside of the panel unit 20 via a gap between the cover glass 270 and the panel housing 280, a sufficient distance can be secured between the gap and the sensor Ts of the position detection sensor 230. As a result, it is possible to reduce a possibility that the panel unit 20 and the printing device 1 may malfunction due to disturbance noise such as static electricity.

In particular, when the size of the touch sensor 400 of the panel unit 20 in a diagonal direction is 10 inches or more, the size of the touch sensor 400 in the short side direction becomes 120 mm or more, and therefore, a possibility of an unintended contact between the user and the panel unit 20 increases. However, with the printing device 1 according to the present embodiment, in the panel unit 20 to which the operation information of the user is input, by making the size of the frame area 420 located along the end on the user side where such disturbance noise such as static electricity is likely to occur larger than the size of the frame area 420 located along the other end, even when the size of the touch sensor 400 of the panel unit 20 in the diagonal direction is a large screen of 10 inches or more, it is possible to reduce the possibility that the panel unit 20 may malfunction due to disturbance noise such as static electricity.

4. Effect

As described above, with the printing device 1 according to the present embodiment, in the panel unit 20 rotatably attached to the printing unit 10, the size of the frame area 421 extending along the lower side 401 in the attachment state β in which the angle formed by the horizontal direction and the normal direction of the touch sensor 400 is smaller than the angle formed by the vertical direction and the normal direction of the touch sensor 400 is made larger than the size of the frame area 422 extending along the upper side 402 in the attachment state β. That is, the size of the frame area 421 located on the operator side of operating the panel unit 20 attached to the printing device 1 is made larger than the size of the frame area 422 located on the side away from the operator.

When the operator operates the panel unit 20, there is a high possibility that the operator's clothes, the hypothenar eminence of the hand, the thumb ball, and the like unintentionally come into contact with the panel unit 20 in the area on the operator side of the panel unit 20. Therefore, there is a high possibility that disturbance noise such as static electricity will occur in the area on the operator side of the panel unit 20. In response to such a problem, by making the size of the frame area 421 located on the operator side of operating the panel unit 20 attached to the printing device 1 larger than the size of the frame area 422 located on the side away from the operator, from the viewpoint of providing the printing device 1 with excellent usability, even when the large panel unit 20 is provided, a possibility that the printing device 1 may malfunction due to the influence of disturbance noise such as static electricity is reduced.

Further, with the printing device 1 according to the present embodiment, in the frame area 420, the size of the frame area 423 located along the side 403 in the direction from the side 403 to the side 404, that is, the direction along the y direction is made smaller than the size of the frame area 421 in the direction from the side 401 to the side 402, that is, the direction along the x direction, and in the frame area 420, the size of the frame area 424 located along the side 404 in the direction from the side 403 to the side 404, that is, the direction along the y direction is made smaller than the size of the frame area 421 in the direction from the side 401 to the side 402, that is, the direction along the x direction. That is, in the panel unit 20, the size of the frame area 421 located on the operator side, which is easily affected by disturbance noise such as static electricity, can be secured to be the largest in the panel unit 20, and the frame areas 422, 423, and 424 located away from the operator side, which are not easily affected by disturbance noise such as static electricity, can be reduced. Thereby, in the panel unit 20, a large operation area 410 operated by the user can be secured, and the possibility that the printing device 1 may malfunction due to the influence of disturbance noise such as static electricity can be reduced.

Further, with the printing device 1 according to the present embodiment, in the panel housing 280, by making the size of the housing side portion 281 located along the side 401 in the direction from the side 401 to the side 402, that is, the direction along the x direction larger than the size of the housing side portion 282 located along the side 402 in the direction from the side 401 to the side 402, that is, the direction along the x direction, a larger area on the user side of the panel unit 20 can be secured, and the possibility that the printing device 1 may malfunction due to the influence of disturbance noise such as static electricity can be further reduced.

Further, with the printing device 1 according to the present embodiment, in the panel housing 280, the size of the housing side portion 283 located along the side 403 in the direction from the side 403 to the side 404, that is, the direction along the y direction is made smaller than the size of the housing side portion 281 in the direction from the side 401 to the side 402, that is, the direction along the x direction, and in the panel housing 280, the size of the housing side portion 284 located along the side 404 in the direction from the side 403 to the side 404, that is, the direction along the y direction is made smaller than the size of the housing side portion 281 in the direction from the side 401 to the side 402, that is, the direction along the x direction. Thereby, the possibility that the panel unit 20 becomes large can be reduced due to securing a large operation area 410 operated by the user, and the possibility that the printing device 1 may malfunction due to the influence of disturbance noise such as static electricity can be reduced.

Further, with the printing device 1 according to the present embodiment, even when the touch sensor 400 of the panel unit 20 becomes large, the possibility that the printing device 1 may malfunction due to the influence of disturbance noise such as static electricity can be reduced. Therefore, from the viewpoint of improving usability, even in the printing device 1 provided with the large touch panel 500 having the touch sensor 400 whose size in the diagonal direction is 10 inches or more, the possibility that the printing device 1 may malfunction due to the influence of disturbance noise such as static electricity can be reduced.

The embodiments have been described above, but the present disclosure is not limited to these embodiments and can be carried out in various modes without departing from the scope of the present disclosure. For example, it is possible to combine the above-described embodiments as appropriate.

The present disclosure includes configurations that are substantially the same as the configurations described in the embodiments (for example, configurations having the same function, method, and result, or configurations having the same object and effect). Further, the present disclosure includes configurations in which non-essential parts of the configurations described in the embodiments are replaced. In addition, the present disclosure includes configurations that achieve the same effect as the configurations described in the embodiments or configurations that can achieve the same object. Further, the present disclosure includes configurations in which known techniques are added to the configurations described in the embodiment.

The following contents are derived from the above-described embodiment.

According to an aspect, there is provided a printing device including a printing unit that performs printing on a medium, and a panel unit to which operation information for operating the printing unit is input, in which the printing unit includes a printing mechanism that executes a printing operation according to the operation information, and a main circuit board including a processor that controls an operation of the panel unit and controls an operation of the printing mechanism based on the operation information, the panel unit includes a display panel, a capacitive touch sensor in which a position detection sensor and a cover glass are laminated, a panel circuit board electrically coupled to the capacitive touch sensor, and a panel housing that stores the display panel, the capacitive touch sensor, and the panel circuit board, the capacitive touch sensor includes a first side, a second side located facing the first side, a third side intersecting both the first side and the second side, and a fourth side located facing the third side, the panel unit is rotatably attached to the printing unit so as to take a first attachment state and a second attachment state, in the first attachment state, an angle formed by a horizontal direction and a normal direction of the capacitive touch sensor is larger than an angle formed by a vertical direction and the normal direction of the capacitive touch sensor, in the second attachment state, the angle formed by the horizontal direction and the normal direction of the capacitive touch sensor is smaller than the angle formed by the vertical direction and the normal direction of the capacitive touch sensor, when the panel unit is in the second attachment state, the capacitive touch sensor is disposed so that the first side is lower than the second side in a direction along the vertical direction, the capacitive touch sensor includes an operation area that receives an input of the operation information and a frame area that is provided around the operation area and does not receive the input of the operation information, and a size of a first frame area located along the first side in the frame area in a direction from the first side to the second side is larger than a size of a second frame area located along the second side in the frame area in the direction from the first side to the second side.

According to the printing device, in the frame area that is provided around the operation area of the touch sensor and does not receive an input of operation information, in the second attachment state in which the angle formed by the horizontal direction and the normal direction of the capacitive touch sensor is smaller than the angle formed by the vertical direction and the normal direction of the capacitive touch sensor, by making the size of the first frame area located below in the vertical direction larger than the size of the second frame area located above in the vertical direction, it is possible to secure a wide frame area located on the operator side, which is easily affected by disturbance noise such as static electricity. Therefore, a possibility that disturbance noise such as static electricity will enter the inside of the panel unit is reduced. Therefore, even when a printing device with excellent usability is provided by increasing the size of the touch sensor of the panel unit, a possibility that the printing device may malfunction due to disturbance noise such as static electricity can be reduced.

In the printing device according to the aspect, a size of a third frame area located along the third side in the frame area in a direction from the third side to the fourth side may be smaller than the size of the first frame area in the direction from the first side to the second side, and a size of a fourth frame area located along the fourth side in the frame area in the direction from the third side to the fourth side may be smaller than the size of the first frame area in the direction from the first side to the second side.

According to the printing device, the size of the first frame area located on the operator side, which is easily affected by disturbance noise such as static electricity, can be secured to be the largest in the panel unit. Thereby, the second frame area, the third frame area, and the fourth frame area located away from the operator side, which are not easily affected by disturbance noise such as static electricity, can be reduced. As a result, in the panel unit, a large operation area operated by the user can be secured, and a possibility that the printing device may malfunction due to the influence of disturbance noise such as static electricity can be reduced. That is, usability can be further improved, and a possibility that the printing device may malfunction due to disturbance noise such as static electricity can be reduced.

In the printing device according to the aspect, the panel housing may include a first side portion located along the first side and a second side portion located along the second side, and a size of the first side portion in the direction from the first side to the second side may be larger than a size of the second side portion in the direction from the first side to the second side.

According to the printing device, in the panel unit, a wide first side portion located on the operator side, which is easily affected by disturbance noise such as static electricity, can be secured. That is, a wide area located on the operator side, which is easily affected by disturbance noise such as static electricity, can be secured. Therefore, a possibility that disturbance noise such as static electricity will enter the inside of the panel unit is further reduced.

In the printing device according to the aspect, the panel housing may include a third side portion located along the third side and a fourth side portion located along the fourth side, a size of the third side portion in a direction from the third side to the fourth side may be smaller than the size of the first side portion in the direction from the first side to the second side, and a size of the fourth side portion in the direction from the third side to the fourth side may be smaller than the size of the first side portion in the direction from the first side to the second side.

According to the printing device, the third side portion and the fourth side portion located away from the operator, which are not easily affected by disturbance noise such as static electricity, can be reduced. Thereby, the possibility that the panel unit becomes large can be reduced due to securing a large operation area operated by the user, and the possibility that the printing device may malfunction due to the influence of disturbance noise such as static electricity can be reduced.

In the printing device according to the aspect, a size of the capacitive touch sensor in a diagonal direction may be 10 inches or more.

According to the printing device, since the possibility that the printing device may malfunction due to the influence of disturbance noise such as static electricity can be reduced, even when the capacitive touch sensor is as large as 10 inches or more, it is possible to provide a printing device with a stable operation and excellent usability.

What is claimed is:

1. A printing device comprising:
   a printing unit that performs printing on a medium; and
   a panel unit to which operation information for operating the printing unit is input, wherein
   the printing unit includes a printing mechanism that executes a printing operation according to the operation information, and a main circuit board including a processor that controls an operation of the panel unit and controls an operation of the printing mechanism based on the operation information,
   the panel unit includes a display panel, a capacitive touch sensor in which a position detection sensor and a cover glass are laminated, a panel circuit board electrically coupled to the capacitive touch sensor, and a panel housing that stores the display panel, the capacitive touch sensor, and the panel circuit board,
   the capacitive touch sensor includes a first side, a second side located facing the first side, a third side intersecting both the first side and the second side, and a fourth side located facing the third side,
   the panel unit is rotatably attached to the printing unit so as to take a first attachment state and a second attachment state,
   in the first attachment state, an angle formed by a horizontal direction and a normal direction of the capacitive touch sensor is larger than an angle formed by a vertical direction and the normal direction of the capacitive touch sensor,
   in the second attachment state, the angle formed by the horizontal direction and the normal direction of the capacitive touch sensor is smaller than the angle formed by the vertical direction and the normal direction of the capacitive touch sensor,
   when the panel unit is in the second attachment state, the capacitive touch sensor is disposed so that the first side is lower than the second side in a direction along the vertical direction,
   the capacitive touch sensor includes an operation area that receives an input of the operation information and a frame area that is provided around the operation area and does not receive the input of the operation information, and
   a size of a first frame area located along the first side in the frame area in a direction from the first side to the second side is larger than a size of a second frame area located along the second side in the frame area in the direction from the first side to the second side.

2. The printing device according to claim 1, wherein
a size of a third frame area located along the third side in the frame area in a direction from the third side to the fourth side is smaller than the size of the first frame area in the direction from the first side to the second side, and
a size of a fourth frame area located along the fourth side in the frame area in the direction from the third side to the fourth side is smaller than the size of the first frame area in the direction from the first side to the second side.

3. The printing device according to claim 1, wherein
the panel housing includes a first side portion located along the first side and a second side portion located along the second side, and
a size of the first side portion in the direction from the first side to the second side is larger than a size of the second side portion in the direction from the first side to the second side.

4. The printing device according to claim 3, wherein
the panel housing includes a third side portion located along the third side and a fourth side portion located along the fourth side,
a size of the third side portion in a direction from the third side to the fourth side is smaller than the size of the first side portion in the direction from the first side to the second side, and
a size of the fourth side portion in the direction from the third side to the fourth side is smaller than the size of the first side portion in the direction from the first side to the second side.

5. The printing device according to claim 1, wherein
a size of the capacitive touch sensor in a diagonal direction is 10 inches or more.

* * * * *